United States Patent
Hahm et al.

(10) Patent No.: US 11,210,597 B1
(45) Date of Patent: Dec. 28, 2021

(54) METHOD AND SYSTEM FOR A REDUCED COMPUTATION HIDDEN MARKOV MODEL IN COMPUTATIONAL BIOLOGY APPLICATIONS

(71) Applicant: Edico Genome Corporation, La Jolla, CA (US)

(72) Inventors: Mark Hahm, San Diego, CA (US); Michael Ruehle, Fort Worth, TX (US); Rami Mehio, San Diego, CA (US)

(73) Assignee: Edico Genome Corporation, La Jolla, CA (US)

( * ) Notice: Subject to any disclaimer, the term of this patent is extended or adjusted under 35 U.S.C. 154(b) by 1562 days.

(21) Appl. No.: 14/811,836

(22) Filed: Jul. 29, 2015

Related U.S. Application Data

(60) Provisional application No. 62/188,443, filed on Jul. 2, 2015.

(51) Int. Cl.
*G06N 7/00* (2006.01)
*G16B 40/00* (2019.01)

(52) U.S. Cl.
CPC ............. *G06N 7/005* (2013.01); *G16B 40/00* (2019.02)

(58) Field of Classification Search
None
See application file for complete search history.

(56) References Cited

U.S. PATENT DOCUMENTS

| | | | |
|---|---|---|---|
| 5,859,972 A | 1/1999 | Subramaniam et al. | |
| 5,964,072 A | 10/1999 | Rasmussen | |
| 5,964,860 A * | 10/1999 | Peterson | G06F 7/02 702/20 |
| 6,112,288 A | 8/2000 | Ullner | |
| 6,253,529 B1 | 7/2001 | De Boer | |
| 6,681,186 B1 | 1/2004 | Denisov et al. | |
| 7,135,701 B2 | 11/2006 | Amin et al. | |
| 7,533,068 B2 | 5/2009 | Maassen van den Brink et al. | |
| 7,680,790 B2 | 3/2010 | Indeck et al. | |
| 7,917,299 B2 | 3/2011 | Buhler et al. | |
| 7,917,302 B2 | 3/2011 | Rognes | |
| 7,945,668 B1 * | 5/2011 | Nucci | G06K 9/622 709/225 |
| 7,948,015 B2 | 5/2011 | Rothberg et al. | |

(Continued)

FOREIGN PATENT DOCUMENTS

| | | |
|---|---|---|
| CN | 105051741 A | 11/2015 |
| EP | 2313523 A2 | 4/2011 |

(Continued)

OTHER PUBLICATIONS

Grabherr, M.G. et al., "Genome-wide synteny through highly sensitive sequence alignment: Satsuma," Bioinformatics, vol. 26, No. 9 (2010) pp. 1145-1151. (Year: 2010).*

(Continued)

*Primary Examiner* — Brian M Smith
(74) *Attorney, Agent, or Firm* — Fish & Richardson P.C.

(57) ABSTRACT

A system and method for a reduced computation hidden markov model (HMM) in computational biology applications is disclosed herein. The method includes performing a correlation between the haplotype sequence and the read sequence at the HMM pre-filter engine. The method includes computing a HMM metric from a reduced number of cells at the HMM computation engine.

24 Claims, 17 Drawing Sheets
Specification includes a Sequence Listing.

(56) References Cited

U.S. PATENT DOCUMENTS

| | | | |
|---|---|---|---|
| 7,969,805 | B2 | 6/2011 | Thom et al. |
| 8,190,548 | B2 | 5/2012 | Choi |
| 8,195,596 | B2 | 6/2012 | Rose et al. |
| 8,209,130 | B1 | 6/2012 | Kennedy et al. |
| 8,217,433 | B1 | 7/2012 | Fife |
| 8,280,640 | B2 | 10/2012 | Levin et al. |
| 8,445,945 | B2 | 5/2013 | Rothberg et al. |
| 8,524,487 | B2 | 9/2013 | Fife |
| 8,558,288 | B2 | 10/2013 | Rothberg et al. |
| 8,560,282 | B2 | 10/2013 | Macready et al. |
| 8,594,951 | B2 | 11/2013 | Homer |
| 8,620,923 | B1 | 12/2013 | Wormley et al. |
| 8,700,689 | B2 | 4/2014 | Macready et al. |
| 8,738,105 | B2 | 5/2014 | Berkley et al. |
| 8,751,166 | B2 | 6/2014 | Friedlander et al. |
| 8,936,763 | B2 | 1/2015 | Rothberg et al. |
| 9,014,989 | B2 | 4/2015 | McMillen et al. |
| 9,026,574 | B2 | 5/2015 | Macready et al. |
| 9,355,365 | B2 | 5/2016 | Berkley et al. |
| 9,405,876 | B2 | 8/2016 | Macready et al. |
| 9,483,610 | B2 | 11/2016 | McMillen et al. |
| 9,576,103 | B2 | 2/2017 | McMillen et al. |
| 9,618,474 | B2 | 4/2017 | van Rooyen et al. |
| 9,792,405 | B2 | 10/2017 | van Rooyen et al. |
| 2003/0033279 | A1 | 2/2003 | Gibson et al. |
| 2003/0033501 | A1 | 2/2003 | Cooke et al. |
| 2003/0039362 | A1 | 2/2003 | Califano et al. |
| 2003/0104470 | A1 | 6/2003 | Fors et al. |
| 2004/0024536 | A1 | 2/2004 | Rognes |
| 2004/0059721 | A1 | 3/2004 | Patzer |
| 2004/0098203 | A1 | 5/2004 | Rognes |
| 2004/0126840 | A1 | 7/2004 | Cheng et al. |
| 2005/0060195 | A1 | 3/2005 | Bessette et al. |
| 2005/0131649 | A1 | 6/2005 | Larsen et al. |
| 2005/0228595 | A1 | 10/2005 | Cooke et al. |
| 2006/0225165 | A1 | 10/2006 | Maassen van den Brink et al. |
| 2007/0038381 | A1 | 2/2007 | Melchior et al. |
| 2007/0078897 | A1 | 4/2007 | Hayashi et al. |
| 2007/0088510 | A1 | 4/2007 | Li et al. |
| 2007/0196816 | A1 | 8/2007 | Schwartz et al. |
| 2008/0005024 | A1 | 1/2008 | Kirkwood |
| 2008/0086274 | A1 | 4/2008 | Chamberlain et al. |
| 2008/0176750 | A1 | 7/2008 | Rose et al. |
| 2008/0250016 | A1 | 10/2008 | Farrar |
| 2009/0121215 | A1 | 5/2009 | Choi |
| 2009/0125248 | A1 | 5/2009 | Shams et al. |
| 2009/0171647 | A1 | 7/2009 | Mannava et al. |
| 2009/0270277 | A1* | 10/2009 | Glick .................. G16B 30/00 506/24 |
| 2010/0077267 | A1 | 3/2010 | Perego et al. |
| 2010/0082805 | A1 | 4/2010 | Orton et al. |
| 2010/0085827 | A1 | 4/2010 | Thom et al. |
| 2010/0169313 | A1 | 7/2010 | Kenedy et al. |
| 2010/0281401 | A1 | 11/2010 | Tebbs et al. |
| 2011/0004413 | A1 | 1/2011 | Carnevali et al. |
| 2011/0093581 | A1 | 4/2011 | Venkatachalam |
| 2011/0184235 | A1 | 7/2011 | Schostek et al. |
| 2012/0001615 | A1 | 1/2012 | Levine |
| 2012/0089339 | A1 | 4/2012 | Ganeshalingam et al. |
| 2012/0102041 | A1 | 4/2012 | Park et al. |
| 2012/0109849 | A1 | 5/2012 | Chamberlain et al. |
| 2012/0149981 | A1 | 6/2012 | Khait et al. |
| 2013/0091121 | A1 | 4/2013 | Galinsky |
| 2013/0110407 | A1 | 5/2013 | Baccash et al. |
| 2013/0124100 | A1 | 5/2013 | Drmanac et al. |
| 2013/0144925 | A1 | 6/2013 | Macready et al. |
| 2013/0157870 | A1 | 6/2013 | Pushkarev et al. |
| 2013/0194882 | A1 | 8/2013 | Ishii et al. |
| 2013/0204851 | A1 | 8/2013 | Bhola et al. |
| 2013/0245958 | A1 | 9/2013 | Forster et al. |
| 2013/0254202 | A1 | 9/2013 | Friedlander et al. |
| 2013/0296175 | A1 | 11/2013 | Rafnar et al. |
| 2013/0297221 | A1 | 11/2013 | Johnson et al. |
| 2013/0311106 | A1 | 11/2013 | White et al. |
| 2013/0316331 | A1 | 11/2013 | Isakov et al. |
| 2013/0324417 | A1 | 12/2013 | Kennedy et al. |
| 2013/0332081 | A1 | 12/2013 | Reese et al. |
| 2013/0338012 | A1 | 12/2013 | Sulem et al. |
| 2013/0338934 | A1 | 12/2013 | Asadi et al. |
| 2014/0024537 | A1 | 1/2014 | Rigatti et al. |
| 2014/0033125 | A1 | 1/2014 | Meral |
| 2014/0045705 | A1 | 2/2014 | Bustamante et al. |
| 2014/0046926 | A1 | 2/2014 | Walton |
| 2014/0051588 | A9 | 2/2014 | Drmanac et al. |
| 2014/0081665 | A1 | 3/2014 | Holmes |
| 2014/0114582 | A1 | 4/2014 | Mittelman et al. |
| 2014/0121116 | A1 | 5/2014 | Richards et al. |
| 2014/0164516 | A1 | 6/2014 | Maltbie et al. |
| 2014/0200166 | A1 | 7/2014 | Rooyen et al. |
| 2014/0236490 | A1 | 8/2014 | McMillen et al. |
| 2014/0297196 | A1 | 10/2014 | Olson |
| 2014/0304276 | A1 | 10/2014 | Boyce |
| 2014/0309944 | A1 | 10/2014 | McMillen et al. |
| 2014/0310215 | A1 | 10/2014 | Trakadis |
| 2014/0316716 | A1 | 10/2014 | Jiang et al. |
| 2014/0337052 | A1 | 11/2014 | Pellini et al. |
| 2014/0350968 | A1 | 11/2014 | Hahn et al. |
| 2014/0368550 | A1 | 12/2014 | Vaske et al. |
| 2014/0371109 | A1 | 12/2014 | McMillen et al. |
| 2014/0371110 | A1 | 12/2014 | Van Rooyen et al. |
| 2015/0066824 | A1 | 3/2015 | Harris et al. |
| 2015/0123600 | A1 | 5/2015 | Groat et al. |
| 2015/0142334 | A1 | 5/2015 | Mishra |
| 2015/0154406 | A1 | 6/2015 | Naehrig et al. |
| 2015/0248525 | A1 | 9/2015 | Ury et al. |
| 2015/0286495 | A1 | 10/2015 | Lee |
| 2015/0310163 | A1 | 10/2015 | Kingsmore et al. |
| 2015/0339437 | A1 | 11/2015 | McMillen et al. |
| 2016/0046986 | A1 | 2/2016 | Eltoukhy et al. |
| 2016/0092631 | A1 | 3/2016 | Yandell et al. |
| 2016/0140290 | A1 | 5/2016 | Rooyen et al. |
| 2016/0171153 | A1 | 6/2016 | Van Rooyen et al. |
| 2016/0178569 | A1 | 6/2016 | Hoffman et al. |
| 2016/0283407 | A1 | 9/2016 | van Rooyen et al. |
| 2017/0270245 | A1 | 9/2017 | van Rooyen et al. |
| 2017/0308644 | A1 | 10/2017 | van Rooyen et al. |

FOREIGN PATENT DOCUMENTS

| | | |
|---|---|---|
| WO | 2011149534 | 12/2011 |
| WO | 2012122546 A2 | 9/2012 |
| WO | 2013128371 | 9/2013 |
| WO | 2013128371 A2 | 9/2013 |
| WO | 2014060305 | 4/2014 |
| WO | 2014060305 A1 | 4/2014 |
| WO | 2014074246 | 5/2014 |
| WO | 2014074246 A1 | 5/2014 |
| WO | 2014113736 A1 | 7/2014 |
| WO | 2014121091 A1 | 8/2014 |
| WO | 2014186604 A1 | 11/2014 |
| WO | 2015051006 A2 | 4/2015 |
| WO | 2015089333 A1 | 6/2015 |
| WO | 2015100427 A1 | 7/2015 |
| WO | 2015123600 A1 | 8/2015 |

OTHER PUBLICATIONS

Benkrid, Khaled, et. al. "A High Performance Reconfigurable Core for Motif Searching Using Profile HMM." *NASA ESA Conference on Adaptive Hardware and Systems*, IEEE, 2008. pp. 285-292.

Carneiro, Mauricio. "Accelerating Variant Calling." Broad Institute, *Intel Genomic Sequencing Pipeline Workshop*, Powerpoint Presentation, Mount Sinai, Dec. 10, 2013. 26 pages.

Chang, Xin, et. al. "FPGA-based Heterogeneous Architecture for Sequence Alignment." 4 pages.

Choi, Young-kyu, et al. "A Quantitative Analysis of Microarchitectures of Modern CPU-FPGA Platforms." Design Automation Conference, Jun. 5-9, 2016, *DAC '16*, Jun. 5-9, 2016. Austin, TX. Conference Presentation. 6 pages.

Chrysanthou, Nafsika, et. al. "Parallel Accelerators for GlimmerHMM Bioinformatics Algorithm." *2011 Design, Automation & Test in Europe Conference & Exhibition*, IEEE, 2011. 6 pages.

(56) References Cited

OTHER PUBLICATIONS

Deutsch, D. "Quantum theory, the Church-Turing principle and the universal quantum computer." *Proceedings of the Royal Society of London* A 400, pp. 97-117 (1985). Printed in Great Britain.

Ferraz, Samuel and Nahri Moreano. "Evaluating Optimization Strategies for HMMer Acceleration on GPU." *2013 International Conference on Parallel and Distributed System*, IEEE, 2013. pp. 59-68.

Feynman, Richard P. "Simulating Physics with Computers." *International Journal of Theoretical Physics*, vol. 21, Nos. 6/7, (1982): pp. 467-488.

Huang, Sitao, et. al. "Hardware Acceleration of the Pair-HMM Algorithm for DNA Variant Calling." *Proceedings of the 2017 ACM/SIGDA International Symposium on Field-Programmable Gate Arrays*, Feb. 22-24, 2017, Monterey, California, USA. pp. 275-284.

International Search Report and Written Opinion issued in International Application No. PCT/US2017/036424, dated Sep. 12, 2017 (Dec. 9, 2017). 12 pages.

International Search Report and Written Opinion issued in International Application No. PCT/US2017/040385, dated Oct. 27, 2017 (Oct. 27, 2017). 15 pages.

Isa, Nazrin M., et. al. "A Novel Efficient FPGA Architecture for HMMER Acceleration." *2012 International Conference on Reconfigurable Computing and FPGAs (ReConFig)*, IEEE, 2013. 6 pages.

Jacob, Arpith, et. al. "Preliminary Results in Accelerating Profile HMM Search on FPGAs." *In Proceedings of 6th IEEE International Workshop on High Performance Computational Biology*, Mar. 2007. 9 pages.

Lloyd, Scott and Quinn O. Snell. "Hardware Accelerated Sequence Alignment with Traceback" *International Journal of Reconfigurable Computing*, vol. 2009, 2009. 10 pages.

Madhavan, Advait, et. al. "Race Logic: A Hardware Acceleration for Dynamic Programming Algorithms." *2014 ACM/IEEE 41st International Symposium on Computer Architecture (ISCA)*, IEEE, 2014. 12 pages.

Peltenburg, Johan, et. al. "Maximizing Systolic Array Efficiency to Accelerate the PairHMM Forward Algorithm." *2016 IEEE International Conference on Bioinformatics and Biomedicine (BIBM)*, IEEE, 2016. pp. 758-762.

Ren, Shanshan, et. al. "FPGA Acceleration of the Pair-HMMs Forward Algorithm for DNA Sequence Analysis." *2015 IEEE International Conference on Bioinformatics and Biomedicine (BIBM)*, IEEE, 2015. 6 pages.

Settle, Sean, et. al. "High-Performance Dynamic Programming on FPGAs with OpenCL." *2013 IEEE High Performance Extreme Computing Conference (HPEC)*, IEEE, 2013. 6 pages.

Sun, Yanteng, et. al. "Accelerating HMMer on FPGAs Using Systolic Array Based Architecture." *IEEE International Symposium on Parallel & Distributed Processing*, IEEE, 2009. 8 pages.

Alachiotis et al, Accelerating Phylogeny-Aware Short DNA Read Alignment with FPGAs, The Exelixis Lab, (2011), pp. 8, Heidelberg Institute for Theoretical Studies, Heidelberg, Germany.

Altera Corp, Implementation of the Smith-Waterman Algorithm on a Reconfigurable Supercomputing Platform, White Paper, 18 pgs Sep. 2007 Ver. 1.

Benkrid et al, A highly parameterized and efficient FPGA-based skeleton for pairwise biological sequence alignment, IEEE Transactions on VLSI Systems, Apr. 2009, 561-570 (1-12), IEEE Educational Activities Dept. Piscataway, NJ.

Buyukkurt et al, Compiler Generated Systolic Arrays for Wavefront Algorithm Acceleration on FPGAs, Sep. 2008, 4 pgs. International Conference on Field Programmable Logic and Applications, Heidelberg, Germany.

Chang, et al, Exploring Sequence Alignment Algorithms on FPGA-based Heterogeneous Architectures, Proceedings IWBBIO, pp. 330-341, 2014, Granada.

Dydel, Stefan and Piotr Bala. "Large Scale Protein Sequence Alignment Using FPGA Reprogrammable Logic Devices, Faculty of Mathematics and Computer Science." N. Copernicus University, 10 pgs, 2004, Torun, Poland.J, Becker, M. Platzner, S. Vernalde (Eds.): FPL 2004, INCS 3203, pp. 23-32, 2004.

Faes, et al, Scalable Hardware Accelerator for Comparing DNA and Protein Sequences, INFOSCALE, 2006, pp. 6, ACM, Hong Kong.

Fagin, FPGA and Rapid Prototyping Technology Use in a Special Purpose Computer for Molecular Genetics, Website: http://www.faginfamily.net/barry/Papers/ICCD92.htm, Thayer School of Engineering, Dartmouth, Hanover, NH (1992). Retrieved Jan. 11, 2017. 6 pages.

Guccione et al, Gene Matching Using JBits, 9 pages Xilinx, Inc. San Jose CA, (2002).

Harris et al, A Banded Smith-Waterman FPGA Accelerator for Mercury BLASTP, Research Report, (2007), 5 pages, BECS Technology, Inc./NIH/NGHRI, St. Louis, Missouri.

Hasan et al, An Overview of Hardware-Based Acceleration of Biological Sequence Alignment, Computational Biology and Applied Bioinformatics, Sep. 2011, pp. 187-202, inTech, Rijeka, Croatia.

Hoang et al., FPGA Implementation of Systolic Sequence Alignment, 1991, 4 pgs NSF Graduate Fellowship.

Hoang, A Systolic Array for the Sequence Alignment Problem, Apr. 1992, 25 pgs, Brown University, Providence, RI.

Hoang, Searching Genetic Databases on Splash 2. FCCM20 Endorsement, 1993, pp. 185-191, Brown University, Providence, RI.

Hughey, Parallel Hardware for Sequence Comparison and Alignment, Cabios, 1996, pp. 473-479, vol. 12 No. 6, Oxford University Press, CA.

Lavenier, Dominque. "SAMBA: Systolic Accelerator for Molecular Biological Applications." Research Report RR-2845, INRIA. 22 pgs, Mar. 1996, France.

Lemoine, et al, High Speed Pattern Matching in Genetic Data Base with Reconfigurable Hardware, ISMB-94 Proceedings, 1994, pp. 269-275, AAAI (www.aaai.org), France.

Lopresti, Rapid Implementation of a Genetic Sequence Comparator Using Field-Programmable Logic Arrays, Advanced Research in VLSI, 1991, pp. 138-152, UC Santa Cruz, CA.

Mahram, FPGA Acceleration of Sequence Analysis Tools in Bioinformatics, Dissertation, 2013, pp. 180, Boston, MA.

Mikami, et al, Efficient FPGA-based Hardware Algorithms for Approximate String Matching, ITC-CSCC, 2008, pp. 201-204, Hiroshima, JP.

Moritz, et al, Implementation of a Parallel Algorithm for Protein Pairwise Alignment Using Reconfigurable Computing, Conference date 2006, Published Feb. 12, 2007. pp. 7, Brazilian National Research Counsel (CNPq), Brazil.

Nawaz, et al, A Parallel FPGA Design of the Smith-Waterman Traceback, Conference date 2010. Published Jan. 6, 2011. pp. 6, ACE Associated Compiler Expert, The Netherlands.

Nawaz, et al, Fast Smith-Waterman hardware implementation, hArtes (IST-035143), (2010), pp. 4, The Morpheus (1ST-027342) and RCOSY (DES-6392) Projects.

Nelson, et al, Shepard: A Fast Exact Match Short Read Aligner, Research Report, (2012), pp. 4, Dept. of Electrical and Computer Engineering, Iowa State University, Ames, IA.

Oliver, et al, Using Reconfigurable Hardware to Accelerate Multiple Sequence Alignment with ClustalW, BioInformatics, 2005, pp. 3431-3432, vol. 21 No. 16, Advanced Access Publication, Singapore.

Oliver, Hyper Customized Processors for Bio-Sequence Database Scanning on FPGAs, FPGA, pp. 229-237, 2005 Monterey, CA.

Sakar, Souradip et al. "Network-on-Chip Hardware Accelerators for Bioiogical Sequence Alignment." IEEE Transactions on Computers, Jan. 2010, vol. 59, No. 1, pp. 29-41, Washington State.

Van Court et al., Families of FPGA-Based Algorithms for Approximate String Matching, (2004), 11 pgs, Boston University, ECE Dept., MA.

Yamaguchi, et al, High Speed Homology Search with FPGAs, Pacific Symposium on Biocomputing 7, 2002, pp. 271-282, Japan.

Yu, et al, A Smith-Waterman Systolic Cell, (2003). 10 pgs Dept. of Computer Science, The Chinese University of Hong Kong.

Chang Mau-Chung Frank et al: "The SMEM Seeding Acceleration for DNA Sequence Alignment." 2016 IEEE 24th Annual Interna-

(56) References Cited

OTHER PUBLICATIONS tional Symposium on Field-Programmable Custom Computing Machines (FCCM), IEEE, [retrieved on Aug. 16, 2016] May 2, 2016 (May 2, 2016), pp. 32-39.
Chang, Xin, et al. "FPGA-based Heterogeneous Architecture for Sequence Alignment." (2014) 4 pages.
International Search Report and Written Opinion issued in International Application No. PCT/US2017/058890, dated Feb. 23, 2018 (Feb. 23, 2018). 16 pages.
Abbas, N. , et al., "Combining Executin Pipelines to Improve Parallel Implementation of HMMER on FPGA", Microprocessors and Microsystems 39(7), Jun. 25, 2015, 457-470.
Derrien, S. , et al., "Hardware Acceleration of HMMER on FPGAs", J Sign Process Syst 58, 2010, 53-67.
EP Extended European Search Report in EP Appln. No. 19199685. 9, dated Jan. 3, 2020, 13 pages.
Giraldo, J. , et al., "A HMMER Hardware Accelerator using Divergences", 2010 Design, Automation & Test in Europe Conference and Exhibition, Mar. 12, 2010, 405-410.
Jiang, K. , et al., "An Efficient Parallel Implementation of the Hidden Markov Methods for Genomic Sequence Search on a Massively Parallel System", IEEE Transaction on Parallel and Distributed Systems 19(1), Jan. 2008, 1-9.
AU Office Action in Australian Appln. No. 2016287752, dated Nov. 26, 2020. 7 pages.
A. McKenna et al. The Genome Analysis Toolkit: A MapReduce framework for analyzing next-generation DNA sequencing data. Genome Research. Published in advance Jul. 19, 2010. 20: 1297-1303.http://genome.cshlp.org/content/20/19/1297.full.html. Retrieved May 25, 2016.
Al Junid et al. "Development of Novel Data Compression Technique for Accelerate DNA Sequence Alignment Based on Smith-Waterman Algorithm." Highlighted. University Technology MARA (UITM). 2009 Third UKSim European Symposium on Computer Modeling and Simulation. pp. 181-186.
Al Junid et al. "Optimization of DNA Sequences Data for Accelerate DNA Sequences Alignment on FPGA." University Technology MARA (UITM). 2010 Fourth Asia International Conference on Mathematical/Analytical Modelling and Computer Simulation. pp. 231-236.
B. Langmead et al. Searching for SNPs with cloud computing. Genome Biology 2009, vol. 10: Iss, II: R134. Published: Nov. 20, 2009. 10 pages.
Clive Maxfield. Impulse achieves 16X speed-up of genome analysis on $2,500 FPGA module. EE Times. Jun. 15, 2012. http://www.eetimes.com/ documentasp?doc id=1317288&print=yes. Retrieved Mar. 29, 2016. 4 pages.
Corey B. Olson et al. "Hardware Acceleration of Short Read Mapping." University of Washington, Pico Computing Inc., Fred Hutchinson Cancer Research CenterSeattle, WA. (2011). 8 pages.
E. Fernandez, W. Najjar, E. Harris, and S. Lonardi. Exploration of Short Reads Genome Mapping in Hardwares. Field Programmable Logic and Applications (FPL), 20th Int. Conf. Milano, Italy, Aug. 2010. 4 pages.
Edward B. Fernandez et al. "Multithreaded FPGA Acceleration of DNA Sequence Mapping." University of California Riverside, Riverside and Jacquard Computing Inc. Riverside. 2012 IEEE. 6 pages.
Edward Fernandez et al. PowerPoint presentation on "Multithreaded FPGA Acceleration of DNA Sequence Mapping." UC Riverside, Department of Computer Science and Engineering Jacquard Computer. 2012. 20 pages.
G. Auwera et al. From FastQ data to high confidence variant calls: the Genome Analysis Toolkit best practices pipeline. HHS Public Access. Published online Oct. 15, 2013. http://www.ncbi.nlm.nih.gov/pmc/articles/PMC42433061/. Retrieved May 25, 2016. 27 pages.
Guo, Xinyu et al., "A Systolic Array-Based FPGA Parallel Architecture for the BLAST Algorithm", IRSN Bioinformatics, 2012, 12 pg, vol. 2012, Article ID 195658.
Hall, Adam. "Short-Read DNA Sequence Alignment with Custom Designed FPGA-based Hardware." Master of Science Thesis. The University of Cambridge, 2007. 186 pages.
Herbordt, Martin et al., "Single Pass Streaming BLAS on FPGAs", NIH Public Access Author Manuscript, Nov. 2007, 25 pgs, Parallel Comput.
Herbordt, Martin, et al., "Single Pass, BLAST-like, Approximate String Matching of FPGAs", Boston University, 2006, 19 pgs, Boston.
International Search Report dated Jun. 18, 2014, for PCT application No. PCT/US2014/012144. 2 pages.
Isaac TS Li et al. Methodology article, 160-fold acceleration of the Smith-Waterman algorithm using a field programmable gate array (FPGA).: Published Jun. 7, 2007. BMC Bioinformatics 2007, 8:185, Institute of Biomaterials and Biomedical Engineering, University of Toronto,Ontario, Canada. 7 pages.
Jacob, Arpith et al., "FPGA-Accelerated seed generation in Mercury BLASTP", Washington University in St. Louis, BECS Technology Inc. (2007) 10 pgs.
Kasap, Server et al, "Design and Implementation of an FPGA-based Core for Gapped BLAST Sequence Alignment with the Two-Hit Method", Engineering Letters, 16:3 EL_16_3_25, Aug. 20, 2012, 10 pgs, Scotland, UK (Advance online publication: Aug. 20, 2008).
Khaled Benkrid et al. Review Article: "High Performance Biological Pairwise Sequence Alignment: FPGA versus GPU versus Cell BE versus GPP." Hindawi Publishing Corporation. International Journal of Reconfigurable Computing. vol. 2012. 16 pages. Institute of Integrated Systems, School of Engineering, The University of Edinburgh, Kings Edinburgh, UK and Electrical and Computer Engineering Department, The University of Arizona, Tucson, AZ.
Lancaster Joseph, "Design and Evaluation of a BLAST Ungapped Extension Accelerator, Master's Thesis", Washington University, Jan. 1, 2006, 79 pgs, Report No. WUCSE-20016-21, 2006 St. Louis.
Lancaster Joseph, et al. "Acceleration of Ungapped Extension in Mercury BLAST", MSP-7th Workshop on Media and Streaming Processors, Nov. 2005, 9 pgs.
M. Ruffalo, T. LaFramboise, and M. Koyuturk. Comparative analysis of algorithms for next-generation sequencing read alignment. Bioinformatics (2011) 27 (20): 2790-2796. First published online: Aug. 19, 2011. https://bioinformatics.oxfordjournals.org/content/27/20/2790.full. Retrieved May 25, 2016.
M. Schatz, B. Langmead, and S. Salzberg. Cloud Computing and the DNA Data Race. HHS Public Access. Published Nat Biotechnol. Jul. 2010; 28(7): 691-693. http://www.ncbi.nlm.nih.gov/pmciarticles/PMC2904649/. Retrieved May 25, 2016.
M. Schatz, C. Trapnell, A. Delcher, and A. Varshney. High-throughput sequence alignment using Graphics Processing Units. Published Dec. 10, 2007. BMC Bioinformatics. http://bmcbioinformatics.biomedcentral.com/articles/10.1186/1471-2105-8-474. Retrieved May 25, 2016. 13 pages.
Michael Schatz. CloudBurst: highly sensitive read mapping with MapReduce. Bioinformatics (2009) 25 (11): 1363-1369. First published online: Apr. 8, 2009. http://bioinformatics.oxfordjournals.org/content/25/11/1363.full. Retrieved May 25, 2016.
Muriki, Krishna et al., "RC-BLAST: Towards a Portable, Cost-Effective Open Source Hardware Implementation" Supported in part by NSF Grant EIA-9985986, (2005) 8 pgs.
N. Homer, B. Merriman, and S. Nelson. BFAST: An Alignment Tool for Large Scale Genome Resequencing. PLOS. Mar. 14, 2011. http://journals.plos.org/plosone/articles?id=10.1371/journal.pone.0007767. Retrieved May 25, 2016. 11 pages.
Olson, Corey Bruce. "An FPGA Acceleration of Short Read Human Genome Mapping." Master of Science Thesis. University of Washington, 2011. 103 pages.
S. Angiuoli and S. Salzberg. Mugsy: fast multiple alignment of closely related whole genomes. Bioinformatics (2011)27 (3): 334-342. First published online: Dec. 9, 2010. http://bioinformatics.oxfordjournals.org/content/27/31334.full. Retrieved May 25, 2016.
Sotiriades Euripides, et al. "FPGA based Architecture for DNA Sequence Comparison and Database Search", University of Crete, 2006, 8 pgs, Crete, Greece.

(56) References Cited

OTHER PUBLICATIONS

Sotiriades Euripides, et al., "Some Initial Results on Hardware BLAST acceleration with a Reconfigurable Architecture", University of Crete, 2006, 8 pgs, Crete, Greece.

T. Derrien et al. Fast Computation and Applications of Genome Mappability. PLOS One. Published: Jan. 19, 2012. 15 pages. http://journals.plos.org/plosone/article?id=10.1371/journal.pone.0030377. Retrieved May 25, 2016.

T. Hardcastle and K. Kelly. baySeq: Empirical Bayesian methods for identifying differential expression in sequence count data. Published Aug. 10, 2010. BMC Bioinformatics. http://bmcbioinformatics.biomedcentral.com/articles/10.1186/1471-2105-11-422. Retrieved May 25, 2016. 16 pages.

Thomas D. Wu and Colin K. Watanabe. Sequence analysis: "GMAP: a genomic mapping and alignment program for mRNA and EST sequences." Publication Feb. 22, 2005. Bioinformatics Original Paper. vol. 21 No. 9 2005, pp. 1859-1875. South San Francisco, CA.

Tim Oliver et al. "Multiple Sequence Alignment on an FPGA." IEEE Computer Society. School of Computer Engineering, Nanyang Technological University, Singapore; Project Proteus, School of Engineering, Ngee Ann Polytechnic, Singapore. Proceedings of the 2005 11th International Conference on Parallel and Distributed Systems. 5 pages.

TimeLogic Division, Active Motif Inc., "Accelerated BLAST Performance with Tera-Blast: a comparison of FPGA versus GPU and CPU Blast implementations", Technical Note, May 2013, 5 pages, Version 1.0.

W. Zhang et al. A Practical Comparison of De Novo Genome Assembly Software Tools for Next-Generation Sequencing Technologies. PLOS One. Published: Mar. 14, 2011. http://journals.plos.org/plosone/article?id=10.1371/journal.pone.0017915. Retrieved May 25, 2016. 10 pages.

Ying Liu et al. "An FPGA-Based Web Server for High Performance Biological Sequence Alignment." The University of Edinburgh, Edinburgh, UK and The Queen's University of Belfast,Northern Ireland, UK. 2009 NASA/ESA Conference on Adaptive Hardware and Systems. pp. 361-368.

Anonymous: "FPGA-accelerated Bioinformics at #ASHG-Dragen Aligner from Edico Genome." Oct. 20, 2014 (Oct. 20, 2014). XP055360856. Retrieved from the internet: URL:http://moolog.us/blogs/glob/2014/210/20/fpga-accelerated-bioinformics-at-ashg-dragen-aligner-from-edico-genome/# [retrieved on Mar. 31, 2017]. 7 pages.

International Search Report and Written Opinion issued in International Application No. PCT/2017/013057, dated Apr. 11, 2017 (Apr. 11, 2017). 10 pages.

Miller, Neil A. et al. "A 26-hour system of highly sensitive whole genome sequencing for emergency management of genetic diseases." Genome Medicine. vol. 7, No. 100, Sep. 30, 2015 (Sep. 30, 2015). 16 pages.

* cited by examiner

METHOD AND SYSTEM FOR A REDUCED COMPUTATION HIDDEN MARKOV MODEL IN COMPUTATIONAL BIOLOGY APPLICATIONS

CROSS REFERENCE TO RELATED APPLICATION

The Present application claims priority to U.S. Provisional Patent Application No. 62/188,443, filed on Jul. 2, 2015, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to variant calling.

Description of the Related Art

The human genome is comprised of approximately 3.1 billion base pairs, and each sequence fragment is typically only from 100 to 500 nucleotides in length. The time and effort that goes into building such full length genomic sequences and determining the variants therein is quite extensive, often requiring the use of several different computer resources applying several different algorithms over prolonged periods of time.

In a particular instance, thousands to millions of fragments of DNA sequences are generated, aligned, and merged in order to construct a genomic sequence that approximates a chromosome in length. A step in this process may include comparing the DNA fragments to a reference sequence to determine where in the genome the fragments align.

A number of such steps are involved in building chromosome length sequences and in determining the variants of the sampled sequence. Accordingly, a wide variety of methods have been developed for performing these steps. For instance, there exist commonly used software implementations for performing one or a series of such steps in a bioinformatics system. However, a common characteristic of such software based bioinformatics methods and systems is that they are labor intensive, take a long time to execute on general purpose processors, and are prone to errors.

Manual or automated DNA sequencing may be employed to determine the sequence of nucleotide bases in a sample of DNA, such as a sample obtained from a subject. Using various different bioinformatics techniques these sequences may then be assembled together to generate the genomic sequence of the subject, and/or mapped and aligned to genomic positions relative to a reference genome. This sequence may then be compared to a reference genomic sequence to determine how the genomic sequence of the subject varies from that of the reference. Such a process involves determining the variants in the sampled sequence and presents a central challenge to bioinformatics methodologies. Genomic data includes sequences of the DNA bases adenine (A), guanine (G), cytosine (C) and thymine (T). Genomic data includes sequences of the RNA bases adenine (A), guanine (G), cytosine (C) and uracil (U). Genomic data also includes epigenetic information such as DNA methylation patterns, histone deacetylation patterns, and the like.

Variant calling is a process of taking the "pileup" of reads covering a given reference genome region, and making a determination of what the most likely actual content of the sampled individual's DNA is within that region. The determined content is reported as a list of differences ("variations" or "variants") from the reference genome, each with an associated confidence level and other metadata.

The most common variants are single nucleotide polymorphisms (SNPs, pronounced "snips"), in which a single base differs from the reference. SNPs occur at about 1 in 1000 positions in a human genome. Next most common are insertions (into the reference) and deletions (from the reference), or "indels" collectively. These are more common at shorter lengths, but can be arbitrarily long. More complex variants include multi-base substitutions (MNPs), and combinations of indels and substitutions which can be thought of as length-altering substitutions. Standard variant callers identify all of these, with some limits on variant lengths. Specialized variant callers are used to identify longer variations, and many varieties of exotic "structural variants" involving large alterations of the chromosomes.

Most of the human genome is diploid, meaning there are two non-identical copies of each chromosome 1-22 in each cell nucleus, one from each parent. The sex chromosomes X and Y are haploid (single copy), with some caveats, and the mitochondrial "chromosome" ChrM is haploid. For diploid regions, each variant can be homozygous, meaning it occurs in both copies, or heterozygous, meaning it occurs in only one. Rarely, two heterozygous variants can occur at the same locus.

Aside from these baseline complexities, there are various noise and error sources to deal with: The collection of sequenced segments ("reads") is random, so some regions will have deeper coverage than others; Each read also comes from a random "strand" in diploid regions; PCR amplification (cloning) of the DNA sample can lead to multiple exact duplicate DNA segments getting sequenced, which can throw off VC statistics. Often a tool is used to mark duplicates before VC, so extra copies can be ignored; Indels and SNPs can be introduced by PCR or other sample prep steps; The sequencer makes mistakes, with an error model varying from one technology to another; Illumina sequencing errors are primarily SNPs; Ion Torrent (LifeTech/Thermo Fisher) errors are primarily homopolymer length inaccuracies, appearing as indels. The likelihood of a sequencer error at a given base is estimated in an associated base quality score, on a logarithmic "phred" scale; Mapping errors occur, in which reads are aligned to the wrong place in the reference genome. The likelihood of a mapping error on a given read is estimated in an associated map quality score "MAPQ" on a logarithmic "phred" scale; Alignment errors occur, in which reads mapped to the correct position are reported with untrue detailed alignments (CIGAR strings). Commonly, an actual indel may be reported instead as one or more SNPs, or vice versa. Also, alignments may be clipped, such that it is not explained how bases near one end align, or if they align at all in this location; There is natural ambiguity about the positions of indels in repetitive sequences.

Given all these complexities, variant calling is a subtle art. Modern variant callers come up with a set of hypothesis genotypes (content of the one or two chromosomes at a locus), use Bayesian calculations to estimate the posterior probability that each genotype is the truth given the observed evidence, and report the most likely genotype along with its confidence level.

Simpler variant callers look only at the column of bases in the aligned read pileup at the precise position of a call being made. More advanced VC's are "haplotype based callers", which take into account context in a window around the call being made. A "haplotype" is particular DNA content (nucleotide sequence, list of variants, etc.) in a single common "strand", e.g. one of two diploid strands in a region, and a haplotype based caller considers the Bayesian implications of which differences are linked by appearing in the same read.

BRIEF SUMMARY OF THE INVENTION

One aspect of the present invention is a method for a reduced computation hidden markov model (HMM) in computational biology applications. The method includes receiving a haplotype sequence at a HMM pre-filter engine. The method also includes receiving a read sequence at the HMM pre-filter engine. The method also includes performing a correlation between the haplotype sequence and the read sequence at the HMM pre-filter engine. The method also includes generating a plurality of control parameters based on the correlation. The method also includes receiving the plurality of control parameters, the read sequence and the haplotype sequence at a HMM computation engine. The method also includes selecting a reduced number of cells of a HMM matrix structure based on the plurality of control parameters at the HMM computation engine. The method also includes computing a HMM metric from the reduced number of cells at the HMM computation engine.

Another aspect of the present invention is a system for analyzing genetic sequence data. The system includes an electronic data source and an integrated circuit. The electronic data source comprises a plurality of reads of genomic data. Each of the plurality of reads of genomic data comprises a sequence of nucleotides. The integrated circuit comprises a plurality of mask-programmed, hardwired digital logic circuits mask-configured as a plurality of processing engines comprising a variant calling module, a plurality of physical electrical interconnects comprising an input to the integrated circuit, and an output from the integrated circuit. The input to the integrated circuit is connected to the electronic data source to receive the plurality of reads of genomic data. The variant calling module is configured to perform a correlation between the haplotype sequence and the read sequence at a HMM pre-filter engine to generate a plurality of control parameters based on the correlation. The variant calling module is configured to receive the plurality of control parameters, the read sequence and the haplotype sequence at a HMM computation engine. The variant calling module is configured to select a reduced number of cells of a HMM matrix structure based on the plurality of control parameters at the HMM computation engine. The variant calling module is configured to compute a HMM metric from the reduced number of cells at the HMM computation engine. The output from the integrated circuit is configured to communicate result data from the variant calling module.

Yet another aspect of the present invention is a method for a reduced computation hidden markov model (HMM) in computational biology applications. The method includes identifying a new haplotype that is similar to a previously read haplotype that is stored in a memory. The method also includes comparing the new haplotype to the previously read haplotype. The method also includes defining a divergence point where a plurality of cell values for the new haplotype diverge from the previously read haplotype. The method also includes commencing a HMM matrix calculation for the new haplotype from the divergence point. The method also includes generating a HMM metric from the HMM matrix calculation and a plurality of HMM matrix calculations from a previously read haplotype up to the divergence point.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
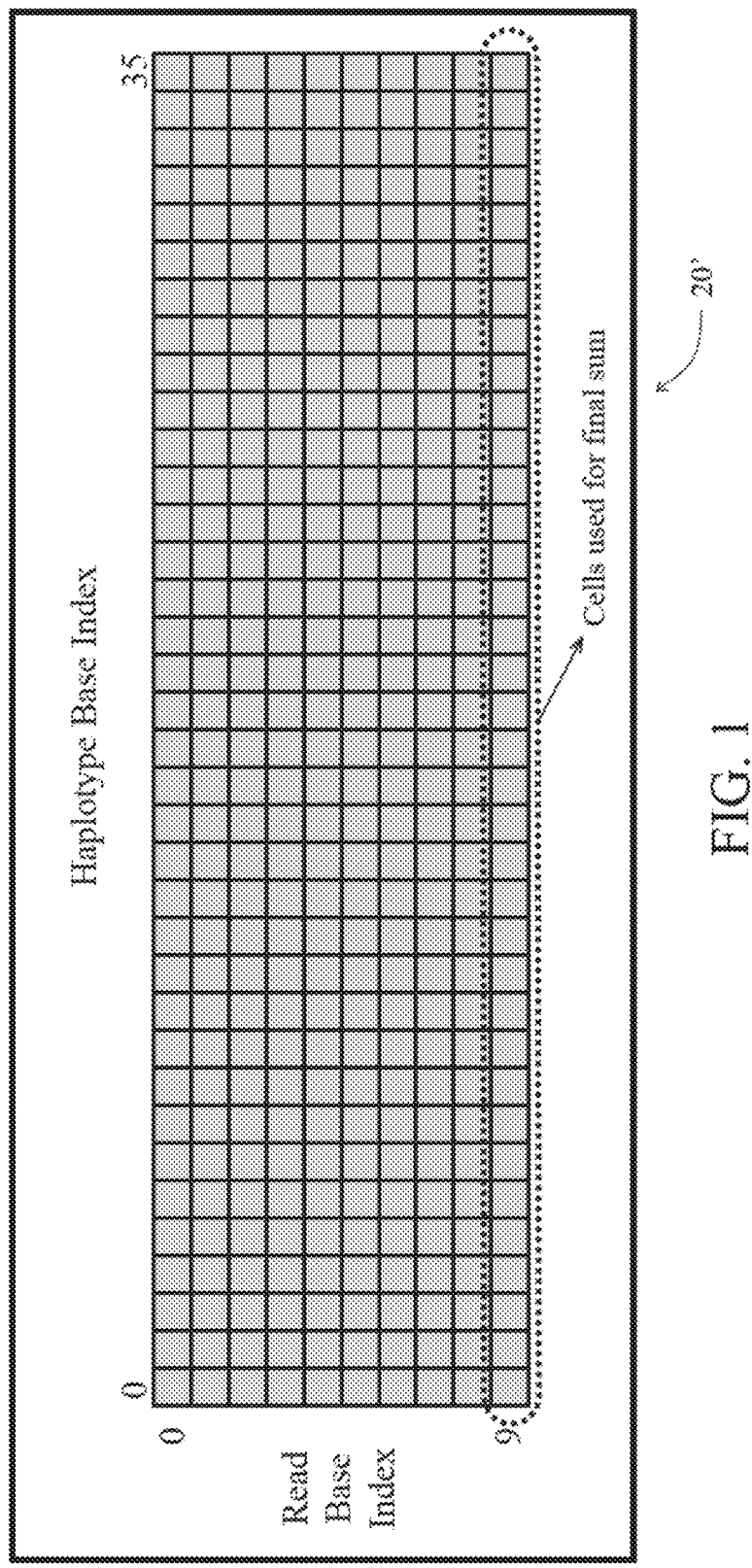
FIG. 1 illustrates a HMM matrix structure of a HMM computation of the prior art.

An accelerated variant caller is modeled on the Broad Institute's GATK HaploypeCaller. In brief, the HaplotypeCaller operates in these major steps: active region identification; localized haplotype assembly; haplotype alignment; read likelihood calculation; and genotyping.

In the active region identification step, places where multiple reads disagree with the reference are identified, and windows around them ("active regions") are selected for processing.

In the localized haplotype assembly step, in each active region, all the overlapping reads are assembled into a "de Bruijn graph" (DBG), a directed graph based on overlapping K-mers (length K subsequences) in each read or multiple reads. When all reads are identical, the DBG is linear; where there are differences, the graph forms "bubbles" of multiple paths diverging and re-joining. If the local sequence is too repetitive and K is too small, cycles can form, which invalidate the graph here; K=10 and 25 are tried by default, and K=35, 45, 55, 65 if necessary to achieve a cycle-free graph. From this DBG, various paths are extracted, which are candidate haplotypes, i.e. hypotheses for what the true DNA sequence may be on at least one strand.

In the haplotype alignment step, each extracted haplotype is Smith-Waterman aligned back to the reference genome, to determine what variation(s) from the reference it implies.

In the read likelihood calculation step, each read is tested against each haplotype, to estimate a probability of observing the read assuming the haplotype was the true original DNA sampled. This calculation is by evaluating a "pair hidden Markov model" (HMM), which models the various possible ways the haplotype might have been modified by PCR or sequencing errors into the read observed. The HMM evaluation uses a dynamic programming method to calculate the total probability of any series of Markov state transitions arriving at the observed read.

In the genotyping step, the possible diploid combinations of the candidate haplotypes are formed, and for each of them, a conditional probability of observing the entire read pileup is calculated, using the constituent probabilities of observing each read given each haplotype from the pair HMM evaluation. These feed into the Bayesian formula to calculate an absolute probability that each genotype is the truth, given the entire read pileup observed.

In this process, by far the most resource extensive operation is the pair HMM evaluation (~8 Haswell core hours, optimized with AVX2 instructions). The present invention accelerates the HMM stage with custom hardware.

The "pair hidden Markov model" is an approximate model for how a true haplotype in the sampled DNA may transform into a possibly different observed read. It is assumed that this transformation is a combination of SNPs and indels, introduced by PCR or other sample prep steps, or by sequencing errors. An underlying 3-state base model is assumed, {M=alignment match, I=insertion, D=deletion}, where any transition is possible except I↔D.

The state transitions here are not in a time sequence, but rather in sequence of progression through the haplotype and read sequences, beginning at position 0 in each sequence, where the first base is position 1. A transition to M implies position+1 in both sequences; a transition to I implies position+1 in the read sequence only; and a transition to D implies position+1 in the haplotype sequence only. The same 3-state model underlies Smith-Waterman/Needleman-Wunsch alignment, allowing for affine gap (indel) scoring, in which gap opening (entering the I or D state) is assumed less likely than gap extension (remaining in the I or D state). So abstractly, the pair HMM can be seen as alignment, and a CIGAR string encodes a sequence of state transitions.

For example, given haplotype sequence "ACGTCACATTTC" and read sequence "ACGTCACTTC", they are aligned with CIGAR string "4M2D6M" (state sequence MMMMDDMMMMMM), as follows:

ACGTCACATT
||||x|||
ACGT-CACT

Observe that the SNP (haplotype 'T' to read 'C') is considered an alignment "match", meaning only that the two bases line up; there is no separate state for a nucleotide mismatch.

In practice, the haplotype is often longer than the read, and the assumption is that the read does not necessarily represent the entire haplotype transformed by SNPs and indels, but only a portion of the haplotype transformed by SNPs and indels. So, state transitions may actually begin at a haplotype position greater than zero, and terminate at a position before the haplotype end. By contrast, state transitions must always run from zero to the end of the read sequence.

Now, though, the 3-state base model is complicated by allowing the transition probabilities to vary by position. For one thing, probabilities of all M transitions are multiplied by prior probabilities of observing the next read base given its base quality score and the corresponding next haplotype base. The base quality score translates to a probability of a sequencing SNP error. When the two bases match, the prior probability is taken as one minus this error probability, and when they mismatch, it is taken as the error probability divided by 3, since there are 3 possible SNP results. At this point, the 3 states are no longer a true Markov model, both because transition probabilities from a given state do not sum to 1, and because the dependence on sequence position, which implies a dependence on previous state transitions, violates the Markov property of dependence only on the current state. The Markov property can be salvaged if you instead consider the Markov model to have 3(N+1)(M+1) states, where N and M are the haplotype and read lengths, and there are distinct M, I, and D states for each haplotype/read coordinate. The sum of probabilities to 1 can be salvaged if an additional "FAIL" state is assumed, with transition probability from each other state of (1−MPriorProb)(MTransProb).

Furthermore, the relative balance of M transitions vs. I and D transitions also varies by position in the read. This is according to an assumed PCR error model, in which PCR indel errors are more likely in tandem repeat regions. Thus, there is a preprocessing of the read sequence, examining repetitive material surrounding each base, and deriving a local probability for M→I and M→D transitions; M→M transitions get the remainder (one minus the sum of these two), times the M prior.

The above discussion is regarding the abstract Markov-ish model. Now follows the practical question of what to do with it. One thing you can do is find the maximum-likelihood transition sequence. This is what we call alignment, and is pretty much the action of Needleman-Wunsch using a dynamic programming algorithm. But for this variant calling application, we are not concerned with the maximum likelihood alignment, or any particular alignment. Rather, we want to compute the total probability of observing the read given the haplotype, which is the sum of the probabilities of all possible transition paths through the graph, from read position zero at any haplotype position, to the read end position at any haplotype position, each component path probability being simply the product of constituent transition probabilities.

Finding this sum of path probabilities is preferably performed by a dynamic programming algorithm. In each cell of a (0 ... N)×(0 ... M) matrix, there are three probability values calculated, corresponding to M, D, and I states. (Or equivalently, there are 3 matrices.) The top row (read position zero) of the matrix is initialized to probability 1.0 in the D states, and 0.0 in the I and M states; and the rest of the left column (haplotype position zero) is initialized to all zeros.

Setting D probability 1 in the top row has the effect of allowing the alignment to begin anywhere in the haplotype. It also forces an initial M transition into the second row, rather than permitting I transitions into the second row.

Each other cell has its 3 probabilities computed from 3 neighboring cells: above, left, and above-left. These 9 input probabilities contribute to the 3 result probabilities according to the state transition probabilities, and the sequence movement rules: transition to D horizontally, to I vertically, and to M diagonally. This 3-to-1 computation dependency restricts the order that cells may be computed. They can be computed left to right in each row, progressing through rows from top to bottom, or top to bottom in each column, progressing rightward.

The bottom row of the matrix, at the final read position, represents completed alignments. HaplotypeCaller works by summing the I and M probabilities of all bottom row cells.

Each HMM evaluation operates on a sequence pair, haplotype and read. Within a given active region, each of a set of haplotypes is HMM-evaluated vs. each of a set of reads.

The haplotype input includes length and bases. The read input includes length, and for each position the base, Phred quality, insGOP (gap open penalty), delGOP, insGCP (gap continuation penalty) and delGCP. The GOP and GCP values are preferably 6-bit Phred integers. The result output is Log scale probability of observing the read given the haplotype.

HaplotypeCaller preferably performs the pair HMM calculation with double precision floating point arithmetic.

The longest pole in computing the M, I, and D probabilities for a new cell is M.

Match cell=prior[i][j]*(mm[i−1][j−1]*transition[i][MtoM]+im[i−1][j−1]*transition[i][IToM]+dm[i−1][j−1]*transition[i][DToM])

The pipeline preferably requires seven input probabilities from already computed neighboring cells (M & D from the left, M & I from above, and M & I & D from above-left), each cycle. It also preferably requires one haplotype base, and one read base with associated parameters each cycle.

To keep the pipeline full, L independent cell calculations should be in progress at any one time, which could come from separate HMM matrices.

One idea is for a single cell pipeline to paint a horizontal swath one row high for each pipeline stage. The pipeline follows an anti-diagonal within the swath, wrapping from the bottom to top of the swath, and wrapping the swath itself when the right edge of the matrix is reached.

FIG. 1 illustrates that all read_length×haplotype_length cells, each containing an M, I and D state, in the HMM matrix are populated in an implementation of the prior art. However, in many instances, the actual cells in the bottom row of the HMM matrix that contribute materially to the final sum value is a small subset of the total number of cells in the bottom row.

Figure 2:
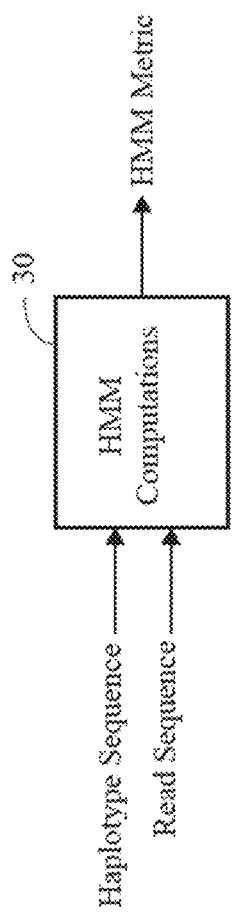
FIG. 2 illustrates a flow chart of a method of the prior art.

FIG. 2 shows the basic inputs (haplotype sequence and read sequence information) and output (the final sum value used as the HMM metric) for a HMM method of the prior art.

The present invention identifies which cells of the HMM matrix will impact the final sum value before the HMM cells are actually computed.

Figure 3:
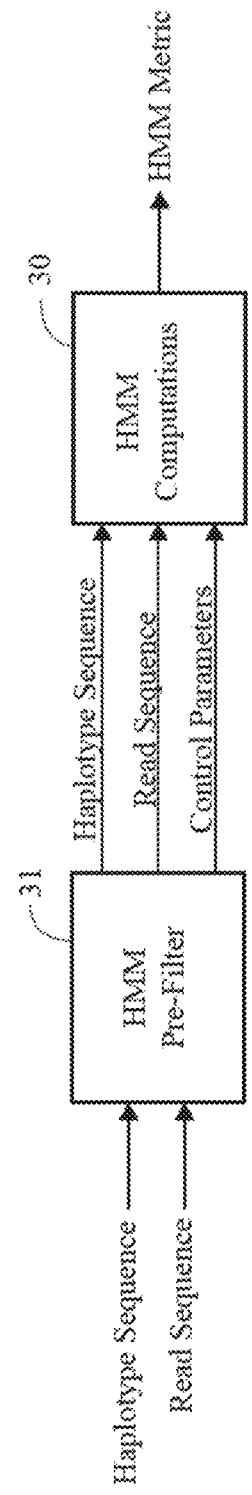
FIG. 3 illustrates a flow chart of a method for reduced computation HMM in computational biology applications.

FIG. 3 illustrates a flow chart of a method for reduced computation HMM in computational biology applications.

Notably, a new engine is inserted in front of the HMM Computations engine 30. This new engine, the "HMM Pre-Filter" engine 31, receives the same inputs as the HMM Computations engine 30 of FIG. 2. The HMM Pre-Filter engine 31 performs a correlation of sorts between the read and haplotype sequence, and, based on this correlation, generates control parameters to send to the downstream HMM Computations engine 30, suggesting which cells of the HMM matrix 20 should be computed to obtain the desired final sum value with fewer operations. The HMM pre-filter engine 31 receives a haplotype sequence and a read sequence. The HMM pre-filter engine 31 performs a correlation between the haplotype sequence and the read sequence. HMM pre-filter engine 31 generates a plurality of control parameters. The HMM computation engine 30 receives the plurality of control parameters, the read sequence and the haplotype sequence. The HMM computation engine 30 selects a reduced number of cells of a HMM matrix structure 20 based on the plurality of control parameters. The HMM computation engine 30 computes a HMM metric from the reduced number of cells.

Figure 4:
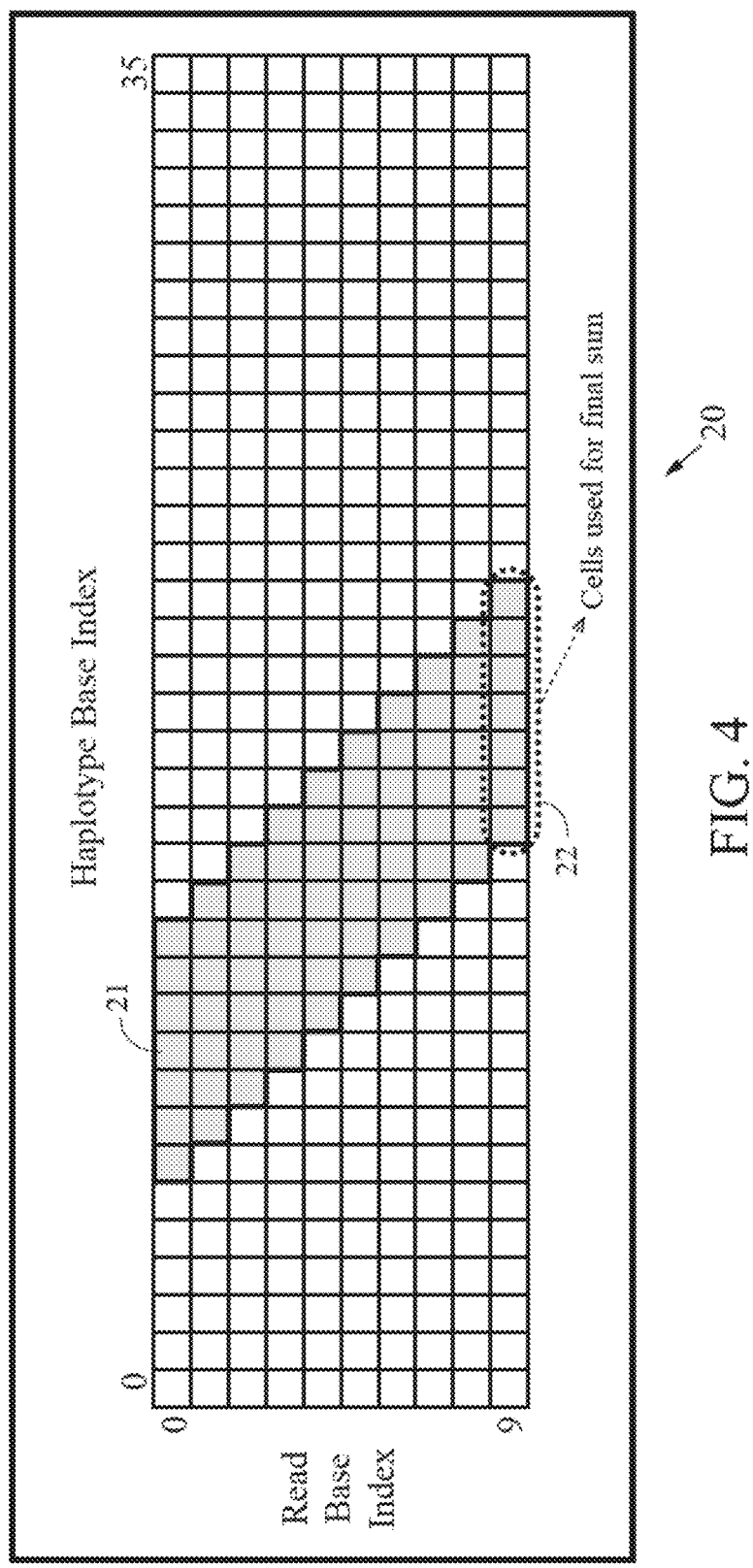
FIG. 4 illustrates a reduced computation HMM matrix structure with cells relevant to a final sum circled and computed HMM cells shaded.
Figure 5:
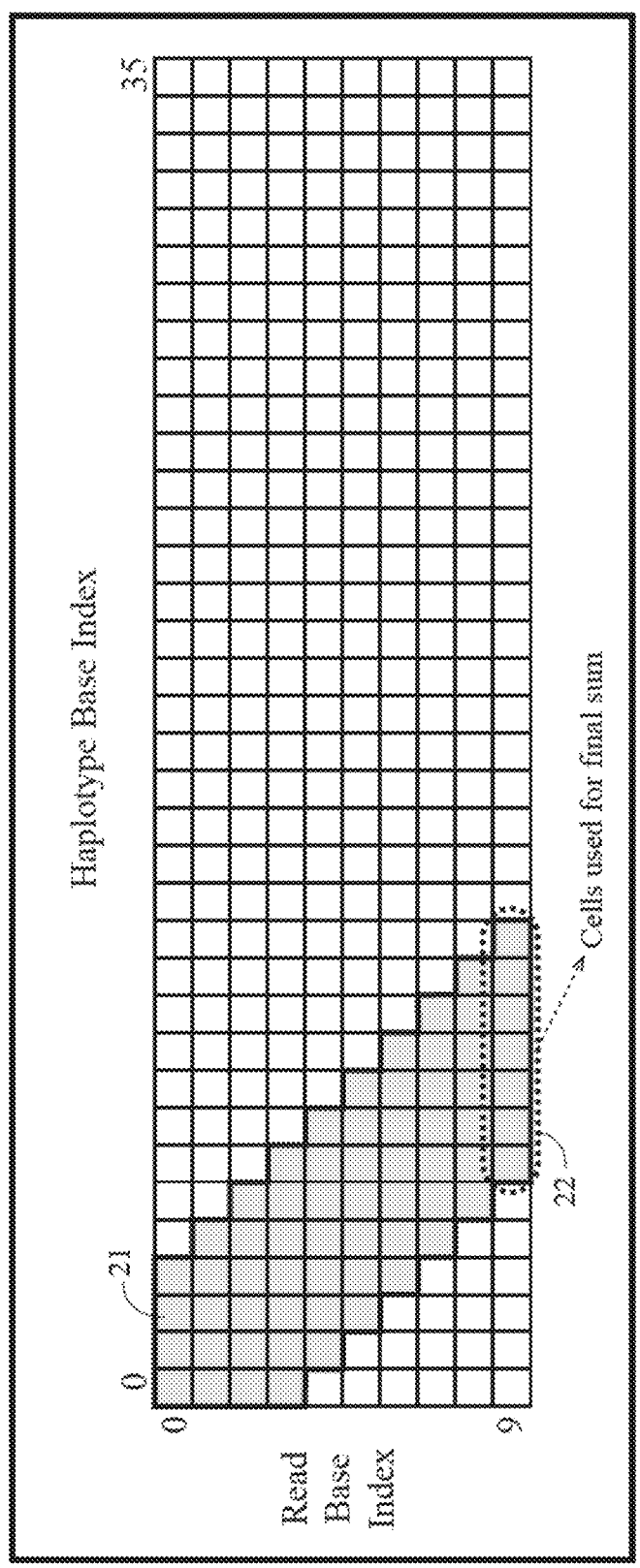
FIG. 5 illustrates a reduced computation HMM matrix structure with cells relevant to a final sum circled and computed HMM cells shaded.
Figure 6:
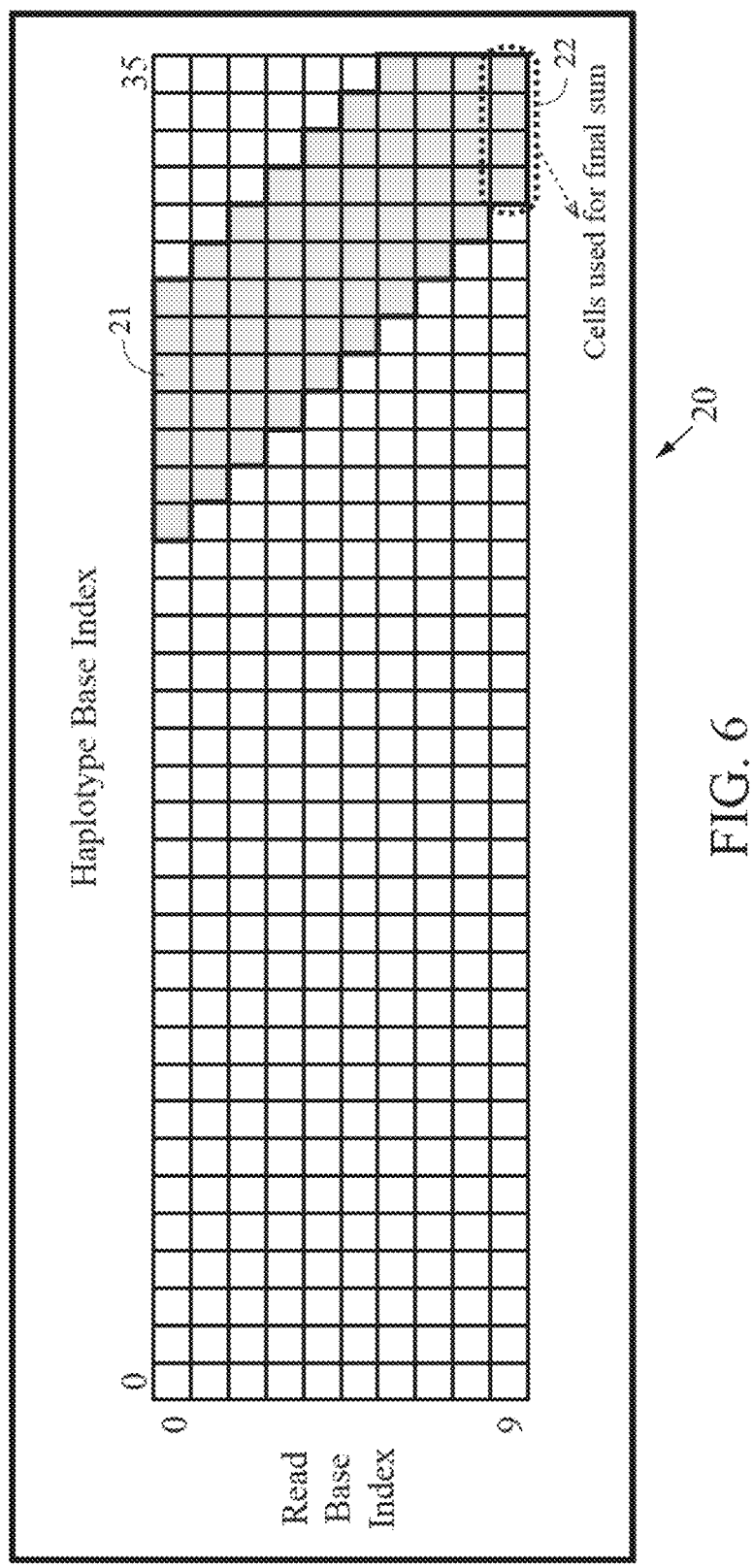
FIG. 6 illustrates a reduced computation HMM matrix structure with cells relevant to a final sum circled and computed HMM cells shaded.

The control parameters communicate a starting center point on a first row 21 (the first row may be the top row of the HMM matrix structure 20 or another row. Those skilled in the pertinent art will recognize that the invention is not limited to the first row being the top row of the HMM matrix structure 20) of the HMM matrix 20 and a desired width (in the haplotype dimension) that should be computed. Equivalently, a starting left edge on the first row 21 and a starting right edge on the first row 21 could be communicated in place of a starting center point and width. The effect of this invention on the computations associated with generating the final sum value for the HMM matrix of FIG. 1 is seen in FIGS. 4-6 for different starting center points (all with a width of seven cells in the haplotype dimension). The cells 22 are used for the final sum.

In FIGS. 4-6, the shaded cells represent those cells of the HMM matrix structure 20 that are actually computed. Compared to FIG. 1, and the potential computational savings of the present invention are evident. A pseudo-code is as follows:

```
Let W=3
H_startpoint=value_delivered_from_prefilter
for read_index=0 to (read_length−1)
  H_left=min(haplotype_length−1, max(0,H_startpoint−W))
  H_right=min(haplotype_length−1, H_startpoint+W)
  for haplotype_index=H_left to H_right
    Update M, I, and D state values for (haplotype_index, read_index) base pairing
  end
  H_startpoint=H_startpoint+1
end
```

In the example above, W is the number of cells to the left and right of the center point that will be evaluated in each row of the HMM matrix structure 20 and is related to the width parameter discussed above. A start point and width parameters could be replaced simply with a starting left and right edge for the first HMM row, in which case the pseudo code is as follows:

```
Let H_left be initialized to 6
Let H_right be initialized to 12
for read_index=0 to (read_length−1)
  for haplotype_index=H_left to H_right
    Update M, I, and D state values for (haplotype_index, read_index) base pairing
  end
```

Figure 7:
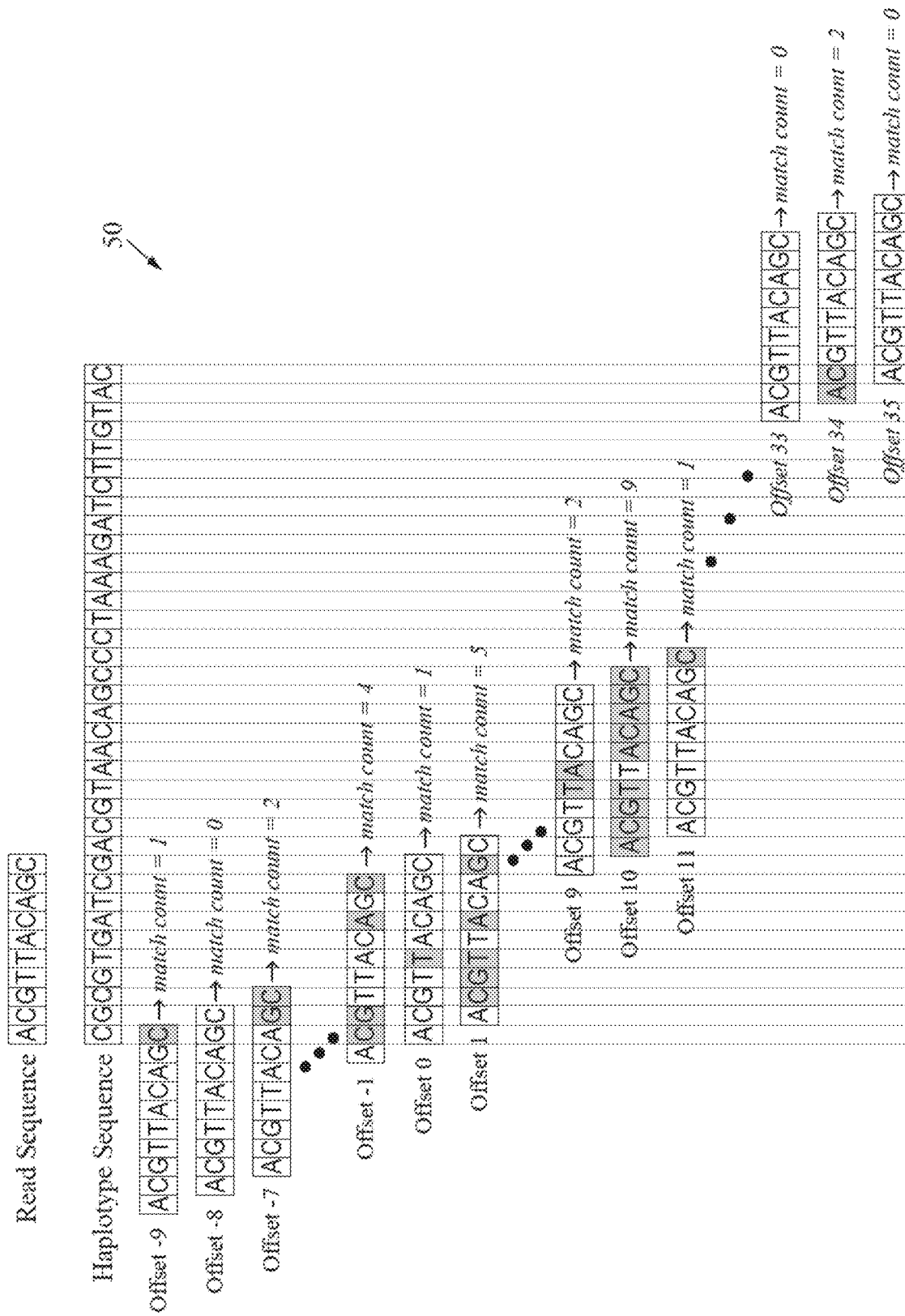
FIG. 7 is an example of a correlation-like operation performed in a HMM pre-filter engine.

H_left=min(haplotype_length−1, H_left+1)
H_right=min(haplotype_length−1, H_right+1)
end FIG. 7 illustrates an example of the correlation 50 performed at the HMM pre-filter engine 31. The offset value of 0 is defined in FIG. 7 as the offset where the first base of the read sequence overlaps (is compared against) the first base of the haplotype sequence. By defining offset 0 in this manner, if there is a maximum correlation value at offset X, then the starting center point for the first top row of the HMM matrix operations is set equal to offset X.

Figure 8:
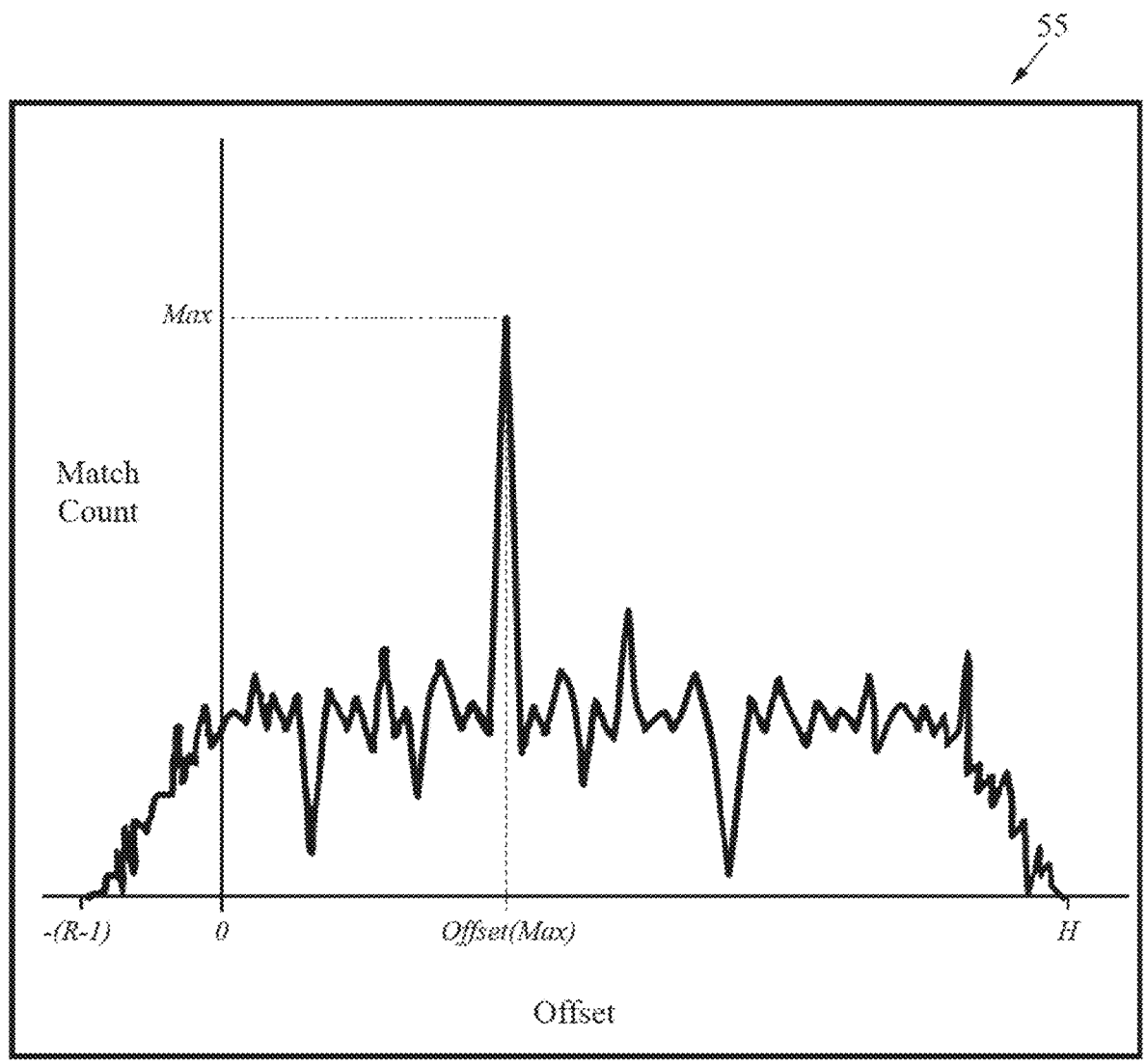
FIG. 8 is a graph of match count versus offset for an output from a correlator-like sliding match count.

FIG. 8 illustrates a graph 55 of an example of an output from a sliding match count correlation operation. The match count spans offsets from −(read_length−1) to +(haplotype_length) on the x axis. The match count, shown on the y-axis may take on a value from 0 to read_length. A match count value equal to read_length would imply that the read sequence exactly matches some contiguous portion of the haplotype sequence without SNPs or indels. A sliding match count output with two pronounced peaks might indicate strong correlation between the read and haplotype sequence, but with an indel in the read sequence.

Other correlation-like operations in addition to the sliding match count correlation-like operations may be used to obtain a starting center point and width parameters from the read and haplotype data. For example, a fast Fourier transform (FFT) may be used, where the base sequences A, C, G and T are set to values of, for example, +1, −1, +j, and −j (where j is the square root of −1). After FFT-based fast correlation, the imaginary and negative outputs are discarded (as non-physical) and ratios similar to those previously discussed between the maximum correlation value and other metrics are derived for confidence and with derivation.

Logic, implemented either in hardware or software, following the sliding match count correlation-like operations examines the match count output to determine if there is high enough confidence to narrow the HMM matrix operations, or not, and, if so, what the width and starting center point of the narrowed path should be. These decisions may be based on, among other values, the following: (1) the position (offset) of the max match count value; (2) the ratio of the max match count value to the read length; (3) the ratio of the max match count value to the second (and/or third, or fourth, or Nth) highest value.

Figure 9:
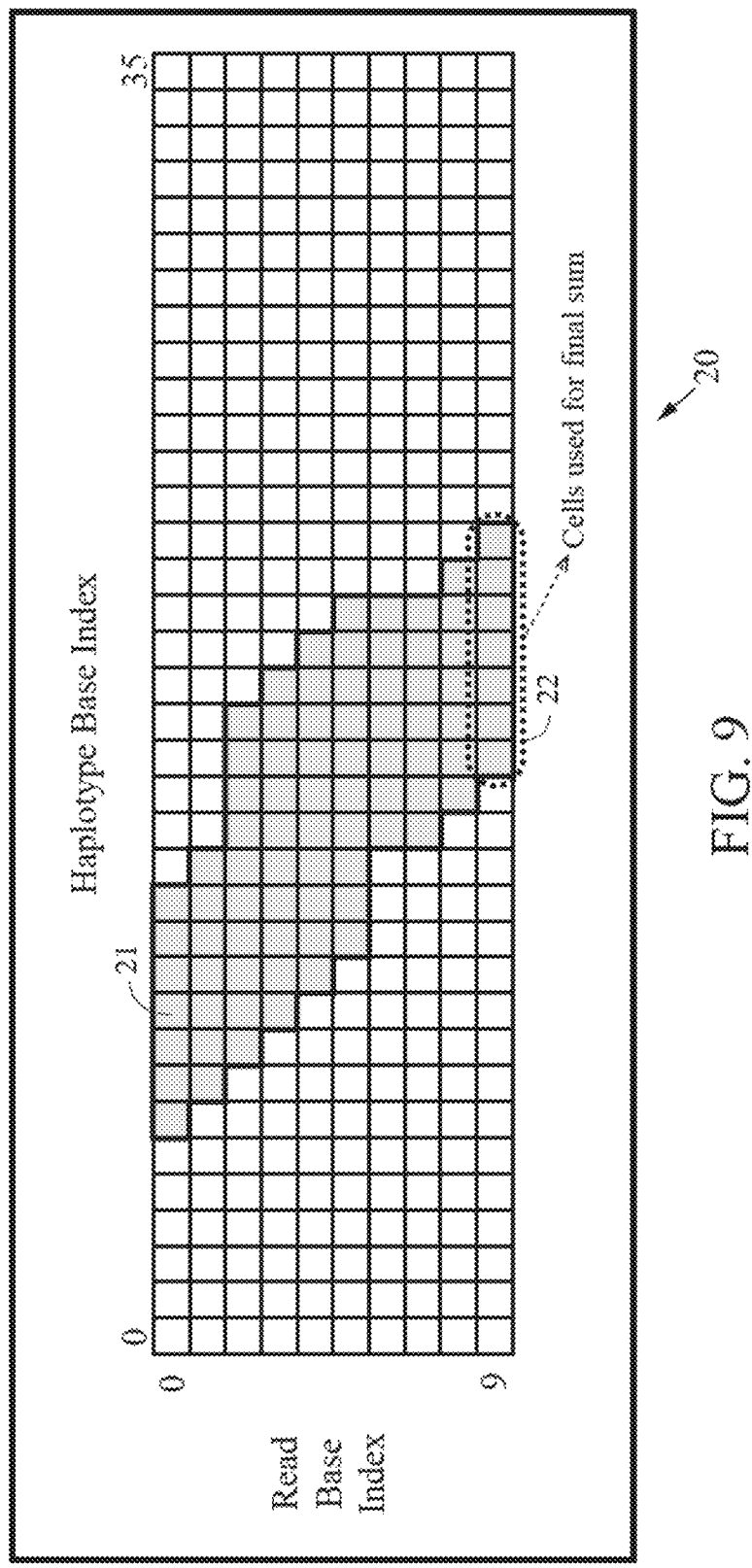
FIG. 9 illustrates a reduced computation HMM matrix structure with cells relevant to a final sum circled and computed HMM cells shaded.

The present invention is not limited from dynamically steering the HMM operations to obtain better final sum accuracy with the same or similar computational resources. For example, as shown in FIG. 9, the present invention is still applicable where the path of the HMM computations may not follow a simple diagonal path, but may move horizontally to the right or vertically down, as needed, depending on the metrics contained in previously-computed cells of the HMM matrix structure 20.

Figure 10:
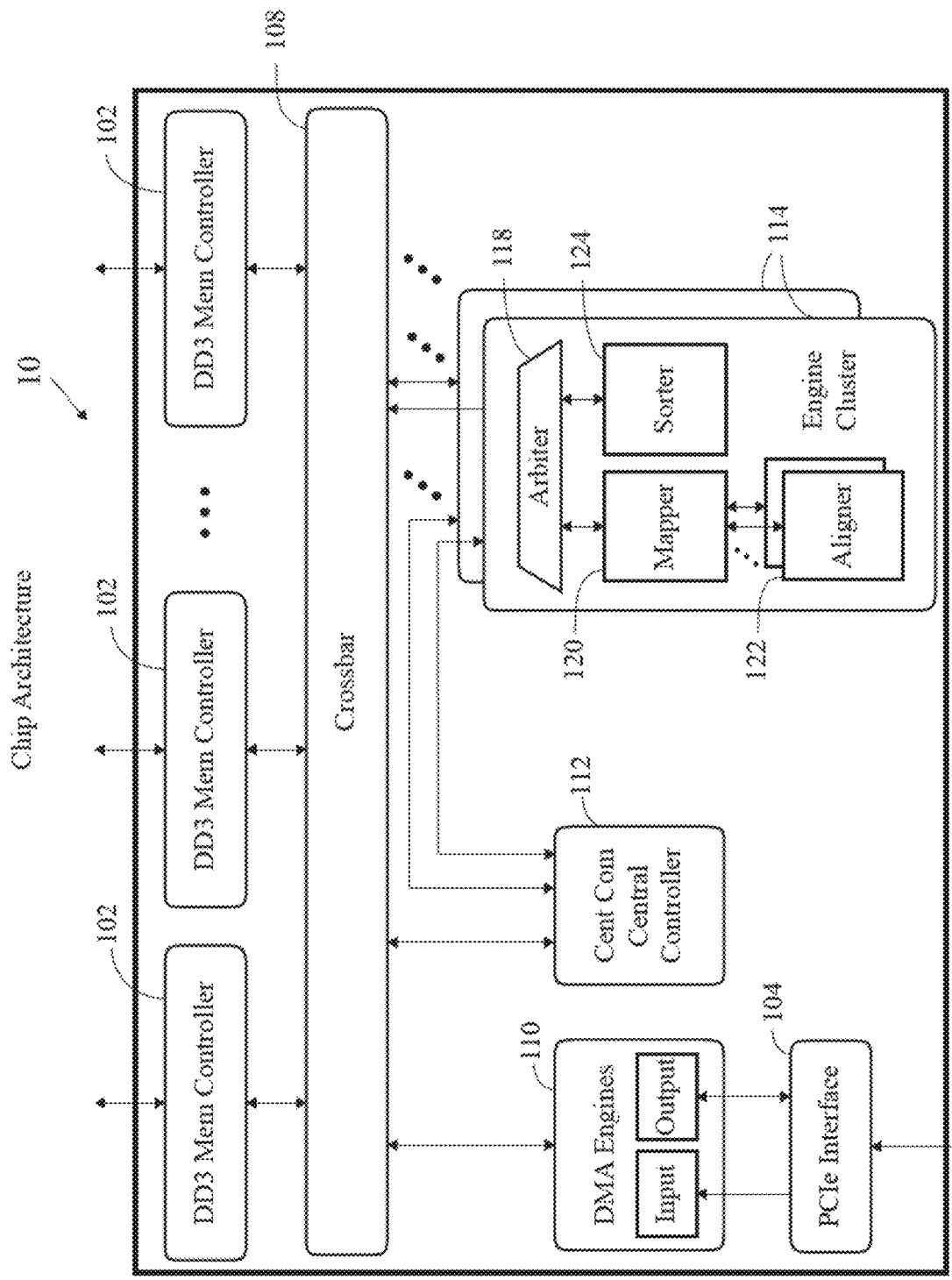
FIG. 10 is a block diagram of a hardware processor architecture.

More specifically, in various embodiments, an apparatus of the disclosure may be a chip, such as a chip that is configured for processing genomics data, such as by employing a pipeline of data analysis modules. According, as shown in FIG. 10, a genomics pipeline processor chip 100 is provided along with associated hardware of a genomics pipeline processor system 101. The chip 100 preferably has one or more connections to external memory 102 (at "DDR3 Mem Controller"), and a connection 104 (e.g., "PCIe Interface") to the outside world, such as a host computer 106, for example. A crossbar 108 (e.g., switch) provides access to the memory interfaces to various requestors. DMA engines 110 transfer data at high speeds between the host and the processor chip's 100 external memories 102 (via the crossbar 108), and/or between the host and a central controller 112. The central controller 112 controls chip operations, especially coordinating the efforts of multiple processing engines. The processing engines are formed of a set of hardwired digital logic circuits that are interconnected by physical electrical interconnects, and are organized into engine clusters 114. In some implementations, the engines in one cluster share one crossbar port, via an arbiter. The central controller 112 has connections to each of the engine clusters. Each engine cluster 114 has a number of processing engines for processing genomic data, including a mapper 120 (or mapping module), an aligner 122 (or aligning module), and a sorter 124 (or sorting module). An engine cluster 114 can include other engines or modules, as well.

In accordance with one data flow model consistent with implementations described herein, the host sends commands and data via the DMA engines 110 to the central controller 112, which load-balances the data to the processing engines. The processing engines return processed data to the central controller 112, which streams it back to the host via the DMA engines 110. This data flow model is suited for mapping and alignment.

In accordance with an alternative data flow model consistent with implementations described herein, the host streams data into the external memory, either directly via DMA engines 110 and the crossbar 108, or via the central controller 112. The host sends commands to the central controller 112, which sends commands to the processing engines, which instruct the processing engines as to what data to process. The processing engines access input data from the external memory, process it, and write results back to the external memory, reporting status to the central controller 112. The central controller 112 either streams the result data back to the host from the external memory, or notifies the host to fetch the result data itself via the DMA engines 110.

Figure 11:
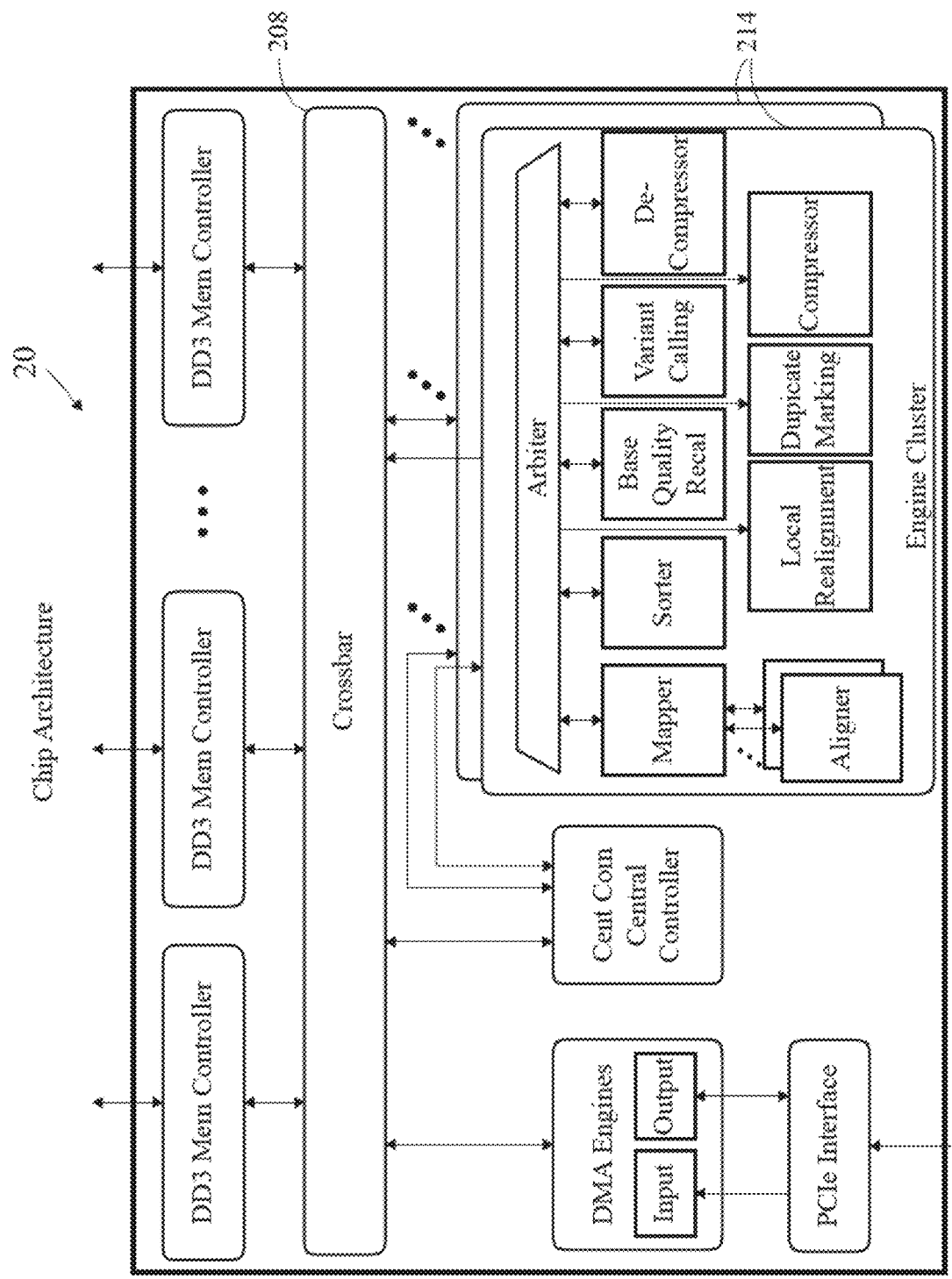
FIG. 11 is a block diagram of a hardware processor.

FIG. 11 illustrates a genomics pipeline processor system 200, showing a full complement of processing engines inside an engine cluster 214. The pipeline processor system 20 may include one or more engine clusters 214. In some implementations, the pipeline processor system 200 includes four our more engine clusters 214. The processing engines or processing engine types can include, without limitation, a mapper, an aligner, a sorter, a local realigner, a base quality recalibrater, a duplicate marker, a variant caller, a compressor and/or a decompressor. In some implementations, each engine cluster 214 has one of each processing engine type. Accordingly, all processing engines of the same type can access the crossbar 208 simultaneously, through different crossbar ports, because they are each in a different engine cluster 214. Not every processing engine type needs to be formed in every engine cluster 214. Processing engine types that require massive parallel processing or memory bandwidth, such as the mapper (and attached aligner(s)) and sorter, may appear in every engine cluster of the pipeline processor system 200. Other engine types may appear in only one or some of the engine clusters 214, as needed to satisfy their performance requirements or the performance requirements of the pipeline processor system 200.

Figure 12:
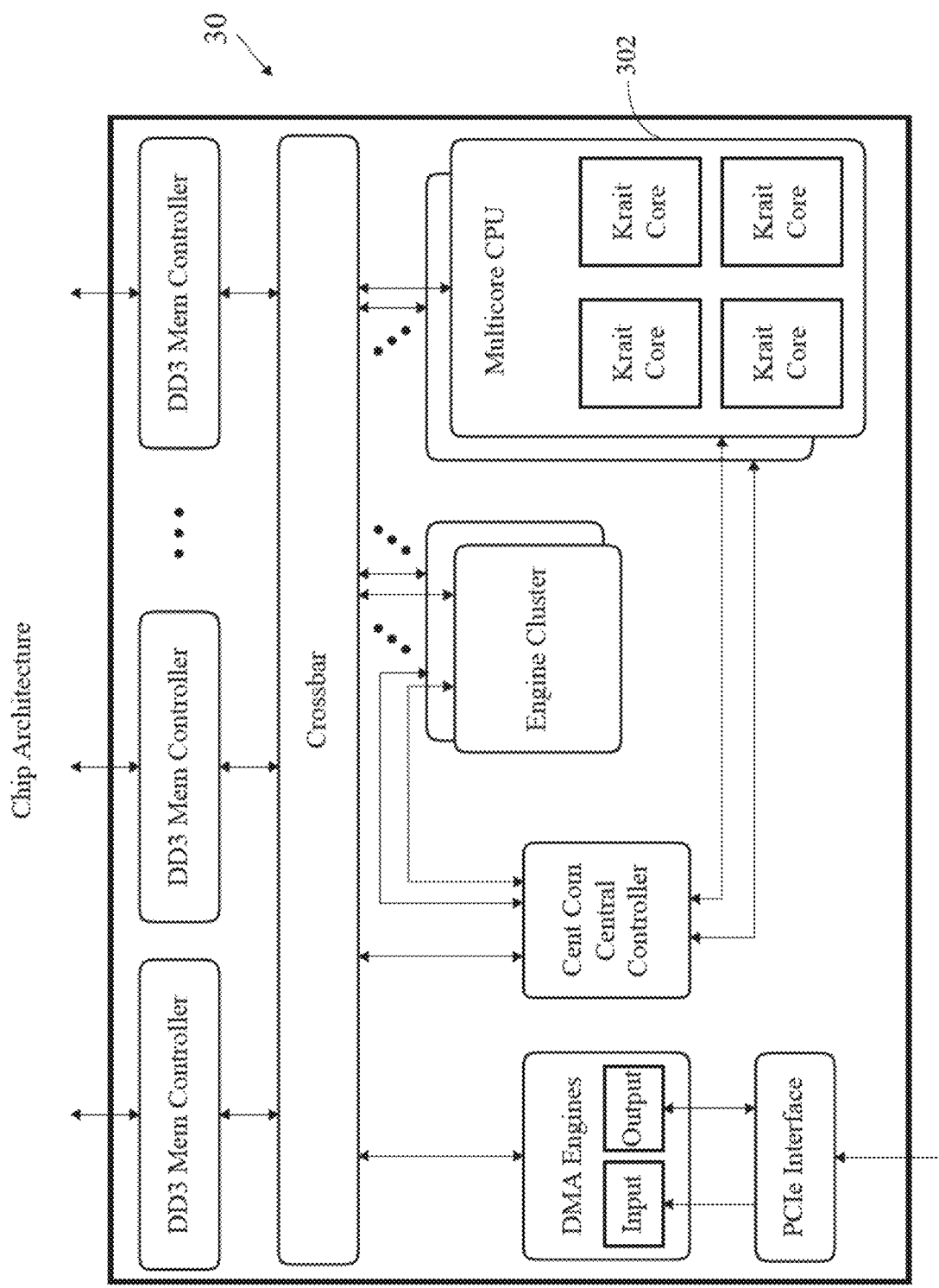
FIG. 12 is a block diagram of a hardware processor architecture.

FIG. 12 illustrates a genomics pipeline processor system 300, showing, in addition to the engine clusters described above, one or more embedded central processing units (CPUs). Examples of such embedded CPUs include Snapdragons® or standard ARM® cores. These CPUs execute fully programmable bio-IT algorithms, such as advanced variant calling. Such processing is accelerated by computing functions in the engine clusters, which can be called by the CPU cores 302 as needed. Furthermore, even engine-centric processing, such as mapping and alignment, can be managed by the CPU cores 302, giving them heightened programmability.

The previous drawings illustrate hardware implementation of a sequence analysis pipeline, which can be done in a number of different ways such as an FPGA or ASIC or structured ASIC implementation. The input to the hardware realization can be a FASTQ file, but is not limited to this format. In addition to the FASTQ file, the input to the FPGA or ASIC or structured ASIC consists of side information, such as Flow Space Information from technology such as the Ion Torrent. The blocks or modules illustrate the following blocks: Error Control, Mapping, Alignment, Sorting, Local Realignment, Duplicate Marking, Base Quality Recalibration, BAM and Side Information reduction and variant calling.

These blocks or modules can be present inside, or implemented by, the hardware, but some of these blocks may be omitted or other blocks added to achieve the purpose of realizing a sequence analysis pipeline. The sequence analysis pipeline platform comprising an FPGA or ASIC or structured ASIC and software assisted by a host (i.e., PC, server, cluster or cloud computing) with cloud and/or cluster storage. The interface can be a PCIe or QPI interface, but is not limited to a PCIe or QPI interface. The hardware (FPGA or ASIC or structured ASIC) can be directly integrated into a sequencing machine. The integration of the hardware sequence analysis pipeline integrated into a host system such as a PC, server cluster or sequencer. Surrounding the hardware FPGA or ASIC or structured ASIC are multiple DDR3 memory elements and a PCIe interface. The board with the FPGA/ASIC/sASIC connects to a host computer, consisting of a host CPU, that could be either a low power CPU such as an ARM®, Snapdragon®, or any other processor.

Figure 13:
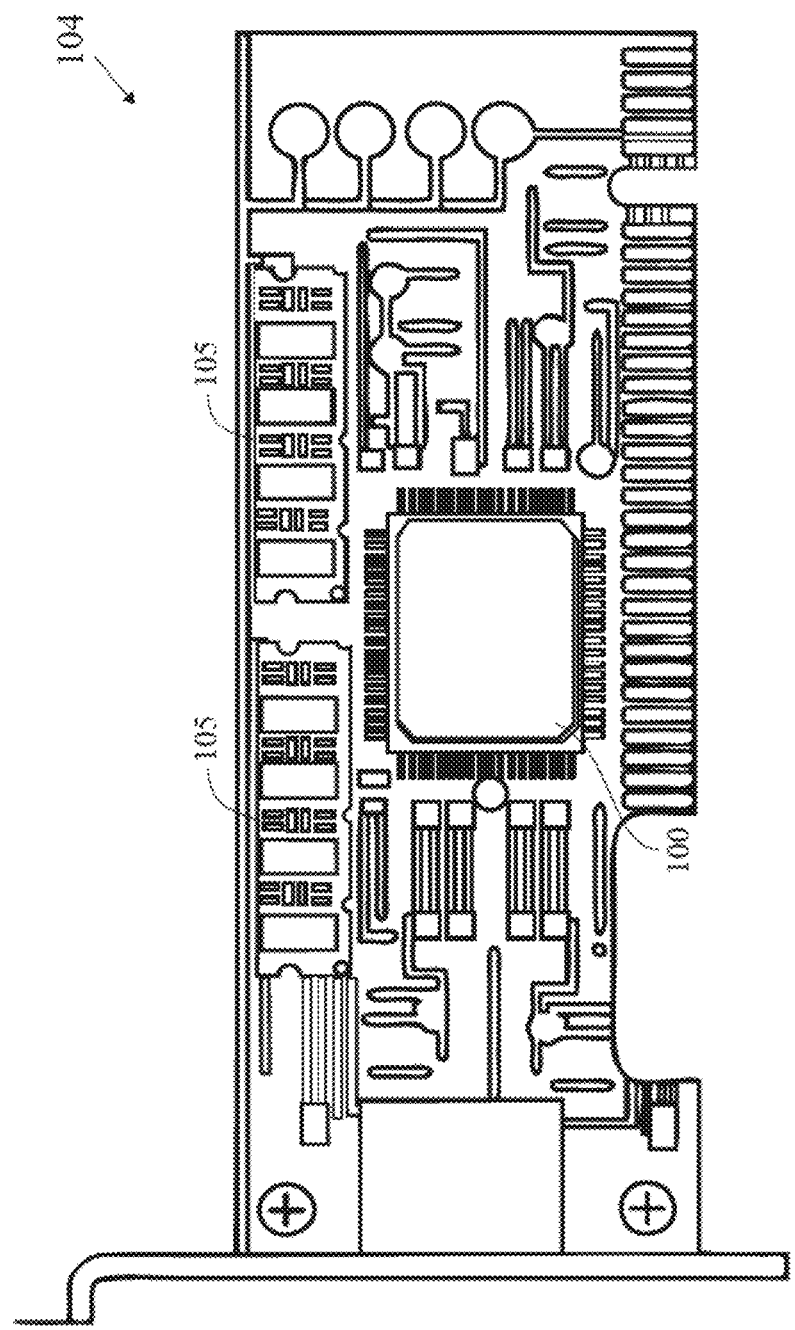
FIG. 13 illustrates an apparatus in accordance with an implementation.
Figure 14:
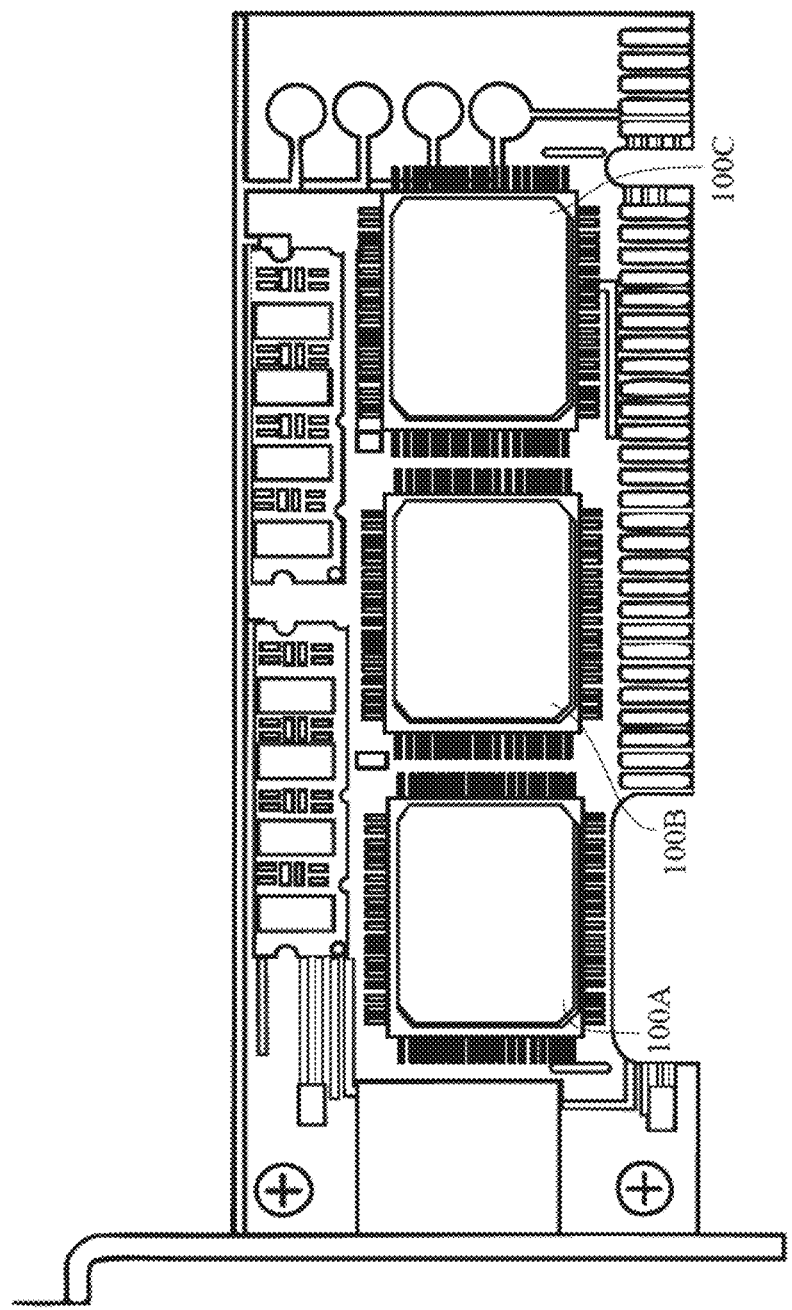
FIG. 14 illustrates an apparatus in accordance with an alternative implementation.

Accordingly, in various embodiments, an apparatus of the disclosure may include a computing architecture, such as embedded in a silicon application specific integrated circuit (ASIC) 100 as seen in FIGS. 13 and 14. The ASIC 100 can be integrated into a printed circuit board (PCB) 104, such as a Peripheral Component Interface-Express (PCIe) card, that can be plugged into a computing platform. In various instances, as shown in FIG. 6, the PCIe card 104 may include a single ASIC 100, which ASIC may be surrounded by local memories 105, however, in various embodiments, the PCIe card 104 may include a plurality of ASICs 100A, 100B and 100C. In various instances, the PCI card may also include a PCIe bus. This PCIe card 104 can be added to a computing platform to execute algorithms on extremely large data sets. Accordingly, in various instances, the overall work flow of genomic sequencing involving the ASIC may include the following: Sample preparation, Alignment (including mapping and alignment), Variant analysis, Biological Interpretation, and/or Specific Applications.

Figure 15:
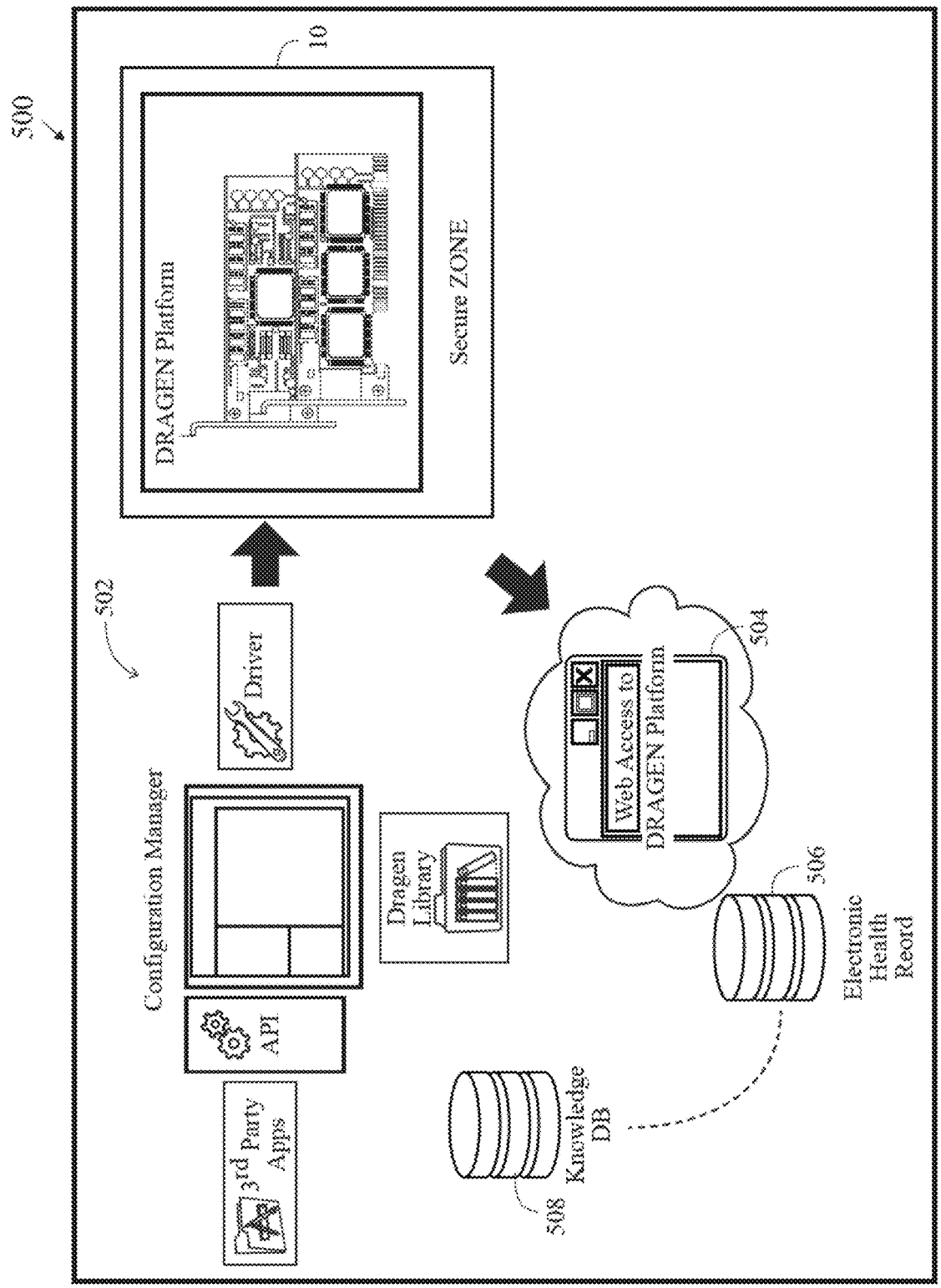
FIG. 15 illustrates a genomics processing system in accordance with an implementation.

FIG. 15 illustrates a system 500 for executing a sequence analysis pipeline on genetic sequence data. The system 500 includes a configuration manager 502 that includes a computing system. The computing system of the configuration manager 502 can include a personal computer or other computer workstation, or can be implemented by a suite of networked computers. The configuration manager 502 can further include one or more third party applications connected with the computing system by one or more APIs, which, with one or more proprietary applications, generate a configuration for processing genomics data from a sequencer or other genomics data source. The configuration manager 502 further includes drivers that load the configuration to the genomics pipeline processor system 10. The genomics pipeline processor system 10 can output result data to, or be accessed via, the Web 504 or other network, for storage of the result data in an electronic health record 506 or other knowledge database 508.

In some implementations, the chip implementing the genomics pipeline processor can be connected or integrated in a sequencer. The chip can also be connected or integrated on an expansion card, e.g. PCIe, and the expansion card can by connected or integrated in a sequencer. In other implementations, the chip can be connected or integrated in a server computer that is connected to a sequencer, to transfer genomic reads from the sequencer to the server. In yet other implementations, the chip can be connected or integrated in a server in a cloud computing cluster of computers and servers. A system can include one or more sequencers connected (e.g. via Ethernet) to a server containing the chip, where genomic reads are generated by the multiple sequencers, transmitted to the server, and then mapped and aligned in the chip.

The memory architecture can consist of M memory modules that interface with an ASIC. The ASIC may be implemented using many different technologies, including FPGAs (Field Programmable Gate Arrays) or structured ASIC, standard cells, or full custom logic. Within the ASIC are a Memory Subsystem (MSS) and Functional Processing Units (FPUs). The MSS contains M memory controllers (MCs) for the memory modules, N system memory interfaces (SMIs) for the FPUs, and an N×M crossbar that allows any SMI to access any MC. Arbitration is provided in the case of contention.

Figure 16:
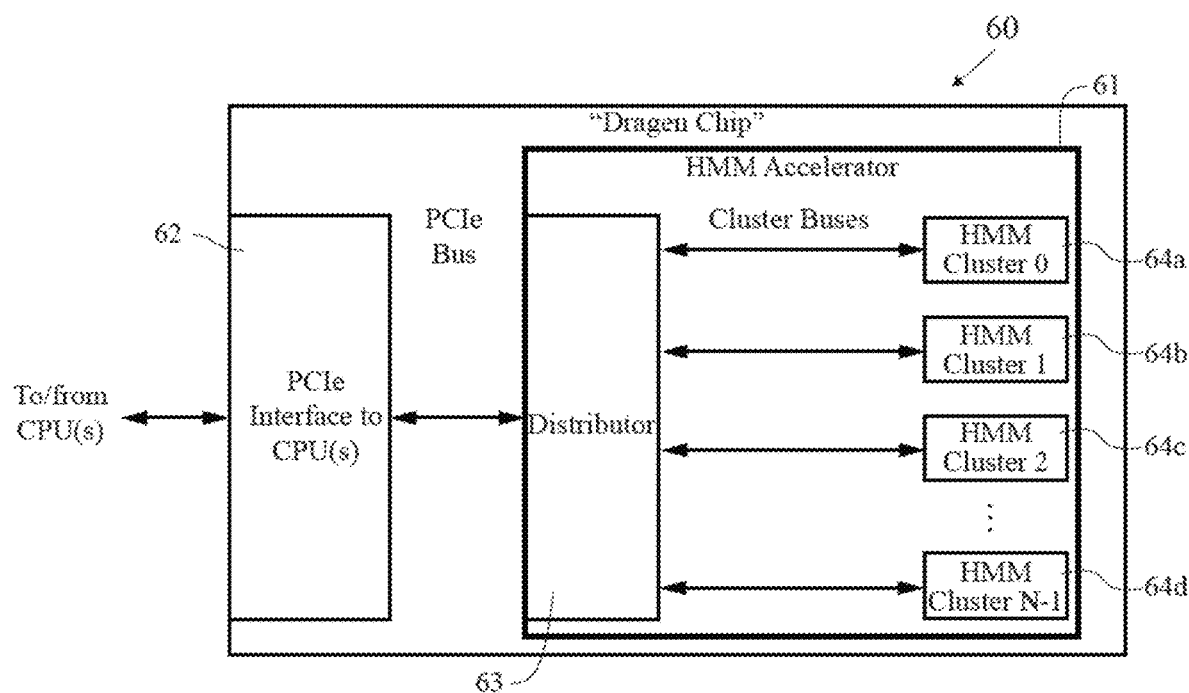
FIG. 16 is a block diagram of a chip illustrating the HMM interface structure.

FIG. 16 illustrates a chip comprising the HMM interface structure. The chip 60 comprises a HMM accelerator 61, multiple HMM clusters 64, a distributor module 63 and a PCIe interface to CPU 62. A CPU communicates with the chip 60 over the PCIe interface 62. The distributor module 63 is positioned between the PCIe interface 62 and the HMM clusters 64. Each HMM cluster may contain multiple HMM accelerator engine instances. The cluster approach is designed to efficiently distribute the high-speed incoming data that arrives via the PCIe interface 62. It is preferred that the PCIe interface 62 is able to provide data at a rate that can keep all of the HMM accelerator instances within all of the HMM clusters 64 busy all of the time, whilst also maintaining the output HMM data that is sent back over the PCIe interface 62.

Figure 17:
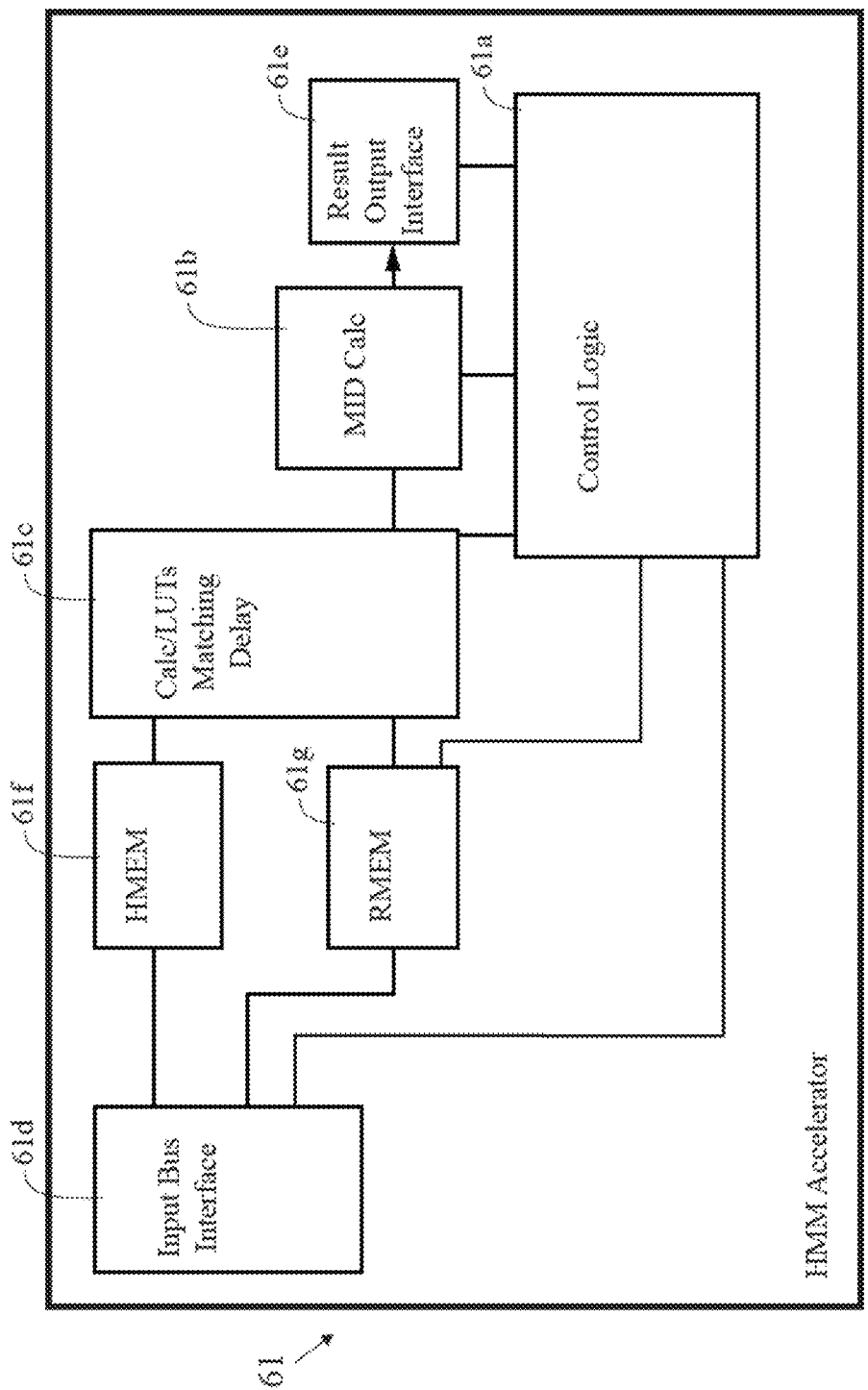
FIG. 17 is a block diagram of a HMM accelerator.

FIG. 17 is a block diagram of a preferred embodiment of an HMM accelerator 61. The HMM accelerator 61 preferably comprises a control logic 61a, a MID calculator 61b, a transition probabilities and priors calculation and/or Look-Up-Tables and matching delay FIFO 61c, a scratch RAM 61d, a result output interface 61e, an HMEM 61f, a RMEM 61g and a input bus interface 61h. The HMEM 61f is used to hold the reference haplotype base identifier information and related information, including a haplotype ID. The haplotype ID is a value that can be generated by the SW-controlled CPU that will be included with the final output sum that is fed back to the CPU; this "Hap ID" is used by SW to associate a final HMM sum output with a specific reference haplotype (different jobs may take different amounts of time, so there is no guarantee that the order in which SW issues the jobs is the order in which it will receive the results from those jobs). The RMEM 61g holds the data associated with the read sequence(s) associated with an HMM job.

Figure 18:
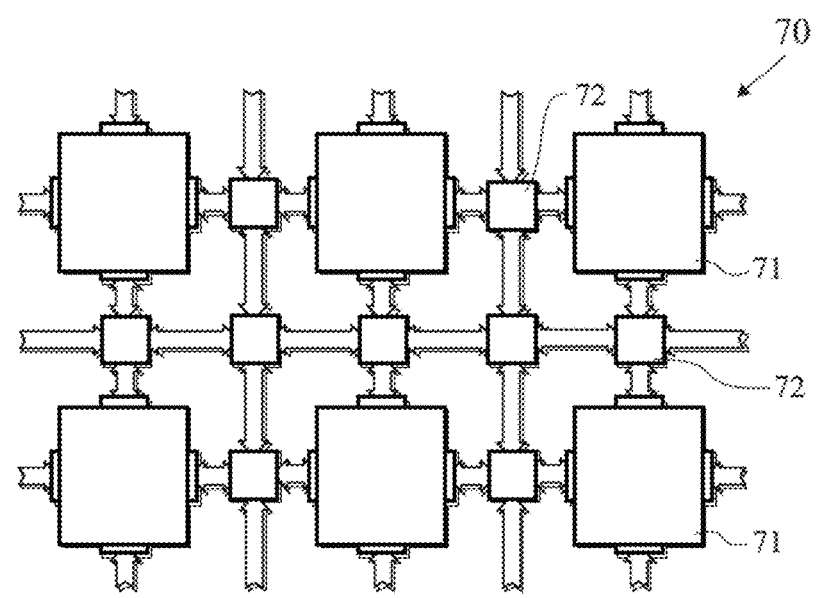
FIG. 18 is an illustration of programmable interconnects and programmable logic blocks for a field programmable gate array.

FIG. 18 is an illustration of programmable interconnects 72 and programmable logic blocks 71 for a field programmable gate array 70.

A more detailed description is set forth in van Rooyen et al., U.S. Patent Publication Number 20140371110 for Bioinformatics Systems, Apparatuses, and Methods Executed On An Integrated Circuit Processing Platform, which is hereby incorporated by reference in its entirety. A more detailed description is set forth in van Rooyen et al., U.S. Patent Publication Number 20140309944 for Bioinformatics Systems, Apparatuses, and Methods Executed On An Integrated Circuit Processing Platform, which is hereby incorporated by reference in its entirety. A more detailed description is set forth in van Rooyen et al., U.S. Patent Publication Number 20140236490 for Bioinformatics Systems, Apparatuses, and Methods Executed On An Integrated Circuit Processing Platform, which is hereby incorporated by reference in its entirety. A more detailed description is set forth in van Rooyen et al., U.S. Patent Publication Number 20140200166 for Bioinformatics Systems, Apparatuses, and Methods Executed On An Integrated Circuit Processing Platform, which is hereby incorporated by reference in its entirety. A more detailed description is set forth in McMillen et al., U.S. Provisional Patent Application No. 62/127,232, filed on Mar. 2, 2015, for Bioinformatics Systems, Apparatuses, And Methods Executed On An Integrated Circuit Processing Platform, which is hereby incorporated by reference in its entirety. A more detailed description is set forth in van Rooyen et al., U.S. Provisional Patent Application No. 62/119,059, filed on Feb. 20, 2015, for Bioinformatics Systems, Apparatuses, And Methods Executed On An Integrated Circuit Processing Platform, which is hereby incorporated by reference in its entirety. A more detailed description is set forth in van Rooyen et al., U.S. Provisional Patent Application No. 61/988,128, filed on May 2, 2014, for Bioinformatics Systems, Apparatuses, And Methods Executed On An Integrated Circuit Processing Platform, which is hereby incorporated by reference in its entirety. A more detailed description of a GFET is set forth in van Rooyen, U.S. Provisional Patent Application No. 62/094,016, filed on Dec. 18, 2014, for Graphene FET Devices, Systems, And Methods Of Using The Same For Sequencing Nucleic Acids, which is hereby incorporated by reference in its entirety. A more detailed description of a GFET is set forth in Hoffman et al., U.S. Provisional Patent Application No. 62/130,594, filed on Mar. 9, 2015, for Chemically Sensitive Field Effect Transistor, which is hereby incorporated by reference in its entirety. A more detailed description of a GFET is set forth in Hoffman et al., U.S. Provisional Patent Application No. 62/130,598, filed on Mar. 9, 2015, for Method And System For Analysis Of Biological And Chemical Materials, which is hereby incorporated by reference in its entirety. A more detailed description of a method and system for growing and transferring a 2D material for a FET is set forth in Hoffman et al., U.S. Provisional Patent Application No. 62/175,351, filed on Jun. 14, 2015, for System And Method For Growing And Transferring Graphene For Use As A FET, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

```
                          SEQUENCE LISTING

<160> NUMBER OF SEQ ID NOS: 1

<210> SEQ ID NO 1
<211> LENGTH: 36
<212> TYPE: DNA
<213> ORGANISM: Artificial Sequence
<220> FEATURE:
<223> OTHER INFORMATION: Computer generated sequence for illustrative
      purposes and not to convey the content of the sequence

<400> SEQUENCE: 1
cgcgtgatcg acgtaacagc cctaaagatc ttgtac                             36
```

We claim as our invention the following:

1. A method for using a reduced computation hidden markov model (HMM) used by a computational biology application, the method comprising:
performing operations of an HMM pre-filter engine, the operations of the HMM pre-filter engine comprising:
receiving, by the HMM pre-filter engine, a haplotype sequence;
receiving, by the HMM pre-filter engine, a read sequence;
performing, by the HMM pre-filter engine, a correlation between the haplotype sequence and the read sequence, wherein performing the correlation comprises:
generating, by the HMM pre-filter engine, a correlation between the haplotype sequence and the read sequence using a Fourier transform;
determining, by the HMM pre-filter engine and based on the correlation, one or more values, wherein each of the one or more determined values corresponds to at least one of an offset of a max match count value, a ratio of a max match count value to a read length, and a ratio of a max match count value to a second highest match count value;
defining, by the HMM pre-filter engine, at least a portion of a first row of an HMM matrix structure and a cell width of the portion based on at least one of the offset of the max match count value, the ratio of the max match count value to the read length, and the ratio of the max match count value to the second highest max match count value; and generating, by the HMM pre-filter engine, a plurality of control parameters based on the correlation, wherein the plurality of control parameters includes data describing the portion of the first row and the cell width of the portion;

and performing operations of an HMM computation engine using a plurality of hardwired digital logic circuits in an integrated circuit, the operations of the HMM computation engine comprising:

receiving, by the HMM computation engine, the plurality of control parameters, the read sequence, and the haplotype sequence;

selecting, by the HMM computation engine, a reduced number of cells of the HMM matrix structure using the received plurality of control parameters, wherein the reduced number of cells of the HMM matrix structure is less than all of the cells of the HMM matrix structure; and computing, by the HMM computation engine, an HMM metric by processing data within each cell of the reduced number of cells selected by the HMM computation engine.

2. The method of claim 1, wherein the data describing the portion of the first row and the cell width of the portion comprises a starting center point and a row width on a first row of the HMM matrix structure.

3. The method of claim 1, wherein the data describing the portion of the first row and the cell width of the portion comprises a starting edge cell on a first row of the HMM matrix structure and an ending edge cell on a first row of the HMM matrix structure.

4. The method of claim 1, wherein the reduced number of cells of the HMM matrix structure is less than half of the number of cells of the HMM matrix structure.

5. The method of claim 1, further comprising:
identifying a new haplotype after a previously read haplotype is stored in a memory;
comparing the new haplotype to the previously read haplotype;
defining a divergence point where a plurality of cell values for the new haplotype diverge from the previously read haplotype; and
commencing an HMM matrix calculation for the new haplotype from the divergence point and using a plurality of HMM matrix calculations from the previously read haplotype up to the divergence point.

6. The method of claim 1, wherein the operations of the HMM pre-filter engine are performed using a processor to execute software instructions.

7. The method of claim 1, wherein the operations of the HMM pre-filter engine are performed using the plurality of hardwired digital logic circuits in an integrated circuit.

8. A method for using a computation hidden markov model (HMM) used by a computational biology application, the method comprising:
performing operations of an HMM pre-filter engine, the operations of the HMM pre-filter engine comprising:
receiving, by the HMM pre-filter engine, a haplotype sequence;
receiving, by the HMM pre-filter engine, a read sequence;
defining, by the HMM pre-filter engine, an offset value of zero to be where a first base of the received read sequence overlaps a first base of the haplotype sequence;
performing, by the HMM pre-filter engine, a correlation between the haplotype sequence and the read sequence, wherein performing the correlation comprises:
for each of a plurality of different offset values:
comparing, by the HMM pre-filter engine, the read sequence to the haplotype sequence;
determining, by the HMM pre-filter engine, a maximum correlation offset value, wherein the maximum correlation offset value is indicative of a particular offset value of the plurality of offset values where the comparison of the read sequence to the haplotype sequence, by the HMM pre-filter engine, yielded a maximum number of bases of the read sequence that matched the haplotype sequence;
defining, by the HMM pre-filter engine, a starting center point for a first row of an HMM matrix structure using the maximum correlation offset value; and
generating, by the HMM pre-filter engine, a plurality of control parameters based on the correlation, wherein the plurality of control parameters includes data describing the starting center point for the first row of the HMM matrix structure; and
performing operations of an HMM computation engine using a plurality of hardwired digital logic circuits in an integrated circuit, the operations of the HMM computation engine comprising:
receiving, by the HMM computation engine, the plurality of control parameters, the read sequence and the haplotype sequence;
selecting, by the HMM computation engine, a reduced number of cells of the HMM matrix structure using the received plurality of control parameters, wherein the reduced number of cells of the HMM matrix structure is less than all of the cells of the HMM matrix structure; and
computing, by the HMM computation engine, an HMM metric by processing data within each cell of the reduced number of cells selected by the HMM computation engine.

9. The method of claim 8, wherein the reduced number of cells of the HMM matrix structure is less than half of the number of cells of the HMM matrix structure.

10. The method of claim 8, the method further comprising:
identifying a new haplotype after a previously read haplotype is stored in a memory;
comparing the new haplotype to the previously read haplotype;
defining a divergence point where a plurality of cell values for the new haplotype diverge from the previously read haplotype; and
commencing a HMM matrix calculation for the new haplotype from the divergence point and using a plurality of HMM matrix calculations from the previously read haplotype up to the divergence point.

11. The method of claim 8, wherein the operations of the HMM pre-filter engine are performed using a processor to execute software instructions.

12. The method of claim 8, wherein the operations of the HMM pre-filter engine are performed using a plurality of hardwired digital logic circuits in an integrated circuit.

13. A system for implementing a reduced computation hidden markov model (HMM) used by a computational biology application comprising:
one or more processors; and
one or more memory devices operatively coupled to the one or more processors to form a computing device, wherein the one or more memory devices store processor-executable instructions which, when executed on the one or more processors, cause the one or more processors to perform operations, the operations comprising:
performing operations of an HMM pre-filter engine, the operations of the HMM pre-filter engine comprising:
receiving, by the HMM pre-filter engine, a haplotype sequence;
receiving, by the HMM pre-filter engine, a read sequence;
performing, by the HMM pre-filter engine, a correlation between the haplotype sequence and the read sequence, wherein performing the correlation comprises:
generating, by the HMM pre-filter engine, a correlation between the haplotype sequence and the read sequence using a Fourier transform;
determining, by the HMM pre-filter engine and based on the correlation, one or more values, wherein each of the one or more determined values corresponds to at least one of an offset of a max match count value, a ratio of a max match count value to a read length, and a ratio of a max match count value to a second highest match count value;
defining, by the HMM pre-filter engine, at least a portion of a first row of an HMM matrix structure and a cell width of the portion based on at least one of the offset of the max match count value, the ratio of the max match count value to the read length, and the ratio of the max match count value to the second highest match count value; and
generating, by the HMM pre-filter engine, a plurality of control parameters based on the correlation, wherein the plurality of control parameters includes data describing the portion of the first row and the cell width of the portion;
and
performing operations of the HMM computation engine using a plurality of hardwired digital logic circuits in an integrated circuit, the operations of the HMM computation engine comprising:
receiving, by the HMM computation engine, the plurality of control parameters, the read sequence and the haplotype sequence;
selecting, by the HMM computation engine, a reduced number of cells of the HMM matrix structure using the received plurality of control parameters, wherein the reduced number of cells of the HMM matrix structure is less than all of the cells of the HMM matrix structure; and
computing, by the HMM computation engine, an HMM metric by processing data within each cell of the reduced number of cells selected by the HMM computation engine.

14. The system of claim 13, wherein the data describing the portion of the first row and the cell width of the portion comprises a starting center point and a row width on a first row of the HMM matrix structure.

15. The system of claim 13, wherein the data describing the portion of the first row and the cell width of the portion comprises a starting edge cell on a first row of the HMM matrix structure and an ending edge cell on a first row of the HMM matrix structure.

16. The system of claim 13, wherein the reduced number of cells of the HMM matrix structure is less than half of the number of cells of the HMM matrix structure.

17. The system of claim 13, the operations further comprising:
identifying a new haplotype after a previously read haplotype is stored in a memory;
comparing the new haplotype to the previously read haplotype;
defining a divergence point where a plurality of cell values for the new haplotype diverge from the previously read haplotype; and
commencing a HMM matrix calculation for the new haplotype from the divergence point and using a plurality of HMM matrix calculations from the previously read haplotype up to the divergence point.

18. The system of claim 13, wherein the operations of the HMM pre-filter engine are performed using a processor to execute software instructions.

19. The system of claim 13, wherein the operations of the HMM pre-filter engine are performed using a plurality of hardwired digital logic circuits in an integrated circuit.

20. A system for implementing a reduced computation hidden markov model (HMM) used by a computational biology application comprising:
one or more processors; and
one or more memory devices operatively coupled to the one or more processors to form a computing device, wherein the one or more memory devices store processor-executable instructions which, when executed on the one or more processors, cause the one or more processors to perform operations, the operations comprising:
performing operations of the HMM pre-filter engine, the operations of the HMM pre-filter engine comprising:
receiving, by the HMM pre-filter engine, a haplotype sequence;
receiving, by the HMM pre-filter engine, a read sequence;
defining, by the HMM pre-filter engine, an offset value of zero to be where a first base of the received read sequence overlaps a first base of the haplotype sequence;
performing, by the HMM pre-filter engine, a correlation between the haplotype sequence and the read sequence, wherein performing the correlation comprises:
for each of a plurality of different offset values:
comparing, by the HMM pre-filter engine, the read sequence to the haplotype sequence;
determining, by the HMM pre-filter engine, a maximum correlation offset value, wherein the maximum correlation offset value is indicative of a particular offset value of the plurality of offset values where the comparison of the read sequence to the haplotype sequence, by the HMM pre-filter engine, yielded a maximum number of bases of the read sequence that matched the haplotype sequence;
defining, by the HMM pre-filter engine, a starting center point for a first row of an HMM matrix structure using the maximum correlation offset value; and
generating, by the HMM pre-filter engine, a plurality of control parameters based on the correlation, wherein the plurality of control parameters includes data describing the starting center point for the first row of the HMM matrix structure; and performing operations of the HMM computation engine using a plurality of hardwired digital logic circuits in an integrated circuit, the operations of the HMM computation engine comprising:

receiving, by the HMM computation engine, the plurality of control parameters generated by one of the HMM pre-filter engines, the read sequence and the haplotype sequence;

selecting, by the HMM computation engine, a reduced number of cells of the HMM matrix structure using the received plurality of control parameters, wherein the reduced number of cells of the HMM matrix structure is less than all of the cells of the HMM matrix structure; and computing, by the HMM computation engine, an HMM metric by processing data within each cell of the identified reduced number of cells selected by the HMM computation engine.

21. The system of claim 20, wherein the reduced number of cells of the HMM matrix structure is less than half of the number of cells of the HMM matrix structure.

22. The system of claim 20, the operations further comprising:

identifying a new haplotype after a previously read haplotype is stored in a memory;

comparing the new haplotype to the previously read haplotype;

defining a divergence point where a plurality of cell values for the new haplotype diverge from the previously read haplotype; and commencing a HMM matrix calculation for the new haplotype from the divergence point and using a plurality of HMM matrix calculations from the previously read haplotype up to the divergence point.

23. The system of claim 20, wherein the operations of the HMM pre-filter engine are performed using a processor to execute software instructions.

24. The system of claim 20, wherein the operations of the HMM pre-filter engine are performed using a plurality of hardwired digital logic circuits in an integrated circuit.

* * * * *